United States Patent
Yamasaki et al.

(10) Patent No.: US 9,647,575 B2
(45) Date of Patent: May 9, 2017

(54) POWER CONVERTER

(71) Applicant: Mitsubishi Electric Corporation, Chiyoda-ku (JP)

(72) Inventors: Hisanori Yamasaki, Tokyo (JP); Sho Kato, Tokyo (JP); Yuruki Okada, Tokyo (JP); Ryo Yokozutsumi, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/761,197

(22) PCT Filed: Sep. 2, 2013

(86) PCT No.: PCT/JP2013/073578
§ 371 (c)(1),
(2) Date: Jul. 15, 2015

(87) PCT Pub. No.: WO2014/174697
PCT Pub. Date: Oct. 30, 2014

(65) Prior Publication Data
US 2015/0357938 A1 Dec. 10, 2015

(30) Foreign Application Priority Data

Apr. 23, 2013 (JP) .................. 2013-090713

(51) Int. Cl.
*H02M 7/5395* (2006.01)
*H02M 7/539* (2006.01)
*H02P 27/00* (2006.01)

(52) U.S. Cl.
CPC .......... *H02M 7/5395* (2013.01); *H02P 27/00* (2013.01)

(58) Field of Classification Search
CPC ..................... H02M 7/5395; H02M 7/539
See application file for complete search history.

(56) References Cited

U.S. PATENT DOCUMENTS

| 4,723,201 A | 2/1988 | Tanamachi et al. |
| 5,155,675 A | 10/1992 | Maruyama et al. |
| (Continued) | | |

FOREIGN PATENT DOCUMENTS

| JP | 58 86874 | 5/1983 |
| JP | 5 64036 | 9/1993 |
| (Continued) | | |

OTHER PUBLICATIONS

Japanese Decision of a Patent Grant Issued on Jul. 15, 2014 in Japanese Patent Application No. 2014-518457 (with English translation) (Total 3 Pages).

(Continued)

*Primary Examiner* — Timothy J Dole
*Assistant Examiner* — Sisay G Tiku
(74) *Attorney, Agent, or Firm* — Oblon, McClelland, Maier & Neustadt, L.L.P.

(57) ABSTRACT

A power converter fixes, in one cycle of an alternating-current voltage output command, a gate pulse signal to always output a direct-current input positive side terminal voltage value of an inverter circuit in a period X1 centering on a phase angle θ1 for higher potential, fixes a gate pulse signal to always output a direct-current input negative side terminal voltage value of the inverter circuit in a period X2 centering on a phase angle θ2 for lower potential, and outputs a gate pulse signal in which a ratio of a period Y1, which is obtained by excluding the periods X1 and X2 from a period between the phase angle θ1 and the phase angle θ2, and the first period X1, and a ratio of a period Y2, which is obtained by excluding the periods X1 and X2 from a period between the phase angle θ2 and a phase angle θ1+360 [deg].

20 Claims, 19 Drawing Sheets

(56) References Cited

U.S. PATENT DOCUMENTS

| | | | | |
|---|---|---|---|---|
| 5,680,299 A * | 10/1997 | Yasuda | ............... | H02M 7/5395 363/41 |
| 6,107,776 A * | 8/2000 | Nakazawa | .............. | H02P 27/08 318/254.2 |
| 6,400,118 B2 | 6/2002 | Kinpara et al. | | |
| 8,489,262 B2 | 7/2013 | Yamasaki | | |
| 2009/0108794 A1 * | 4/2009 | Ochiai | .............. | H02M 7/53875 318/760 |
| 2009/0160381 A1 * | 6/2009 | Imura | ................ | H02P 21/0003 318/400.15 |
| 2009/0237013 A1 * | 9/2009 | Sato | ..................... | B60L 15/025 318/400.02 |
| 2010/0060211 A1 * | 3/2010 | Hashimoto | ............. | H02P 21/22 318/400.02 |
| 2010/0134053 A1 * | 6/2010 | Yamada | ............ | H02M 7/53875 318/162 |
| 2010/0250067 A1 * | 9/2010 | Matsumura | ............ | B62D 5/046 701/41 |
| 2011/0115420 A1 * | 5/2011 | Yamada | .................. | H02P 27/04 318/400.09 |
| 2011/0187308 A1 * | 8/2011 | Suhama | .................. | H02P 27/04 318/798 |
| 2011/0193509 A1 | 8/2011 | Ooyama et al. | | |
| 2012/0032620 A1 * | 2/2012 | Shimada | ............. | H02P 21/0089 318/400.09 |
| 2013/0187582 A1 * | 7/2013 | Nishimura | ................ | H02P 6/10 318/400.14 |
| 2013/0187583 A1 * | 7/2013 | Iwatsuki | ................... | H02P 6/10 318/400.17 |
| 2014/0049198 A1 | 2/2014 | Ooyama et al. | | |
| 2014/0152214 A1 * | 6/2014 | Furukawa | ............. | B60L 15/025 318/400.13 |
| 2014/0232318 A1 * | 8/2014 | Yokozutsumi | ........ | H02P 27/085 318/722 |
| 2016/0072424 A1 * | 3/2016 | Yokozutsumi | .... | H02M 7/53875 318/503 |

FOREIGN PATENT DOCUMENTS

| | | |
|---|---|---|
| JP | 2566021 | 12/1996 |
| JP | 2654118 | 9/1997 |
| JP | 3700019 | 9/2005 |
| JP | 2005 318755 | 11/2005 |
| JP | 3812290 | 8/2006 |
| JP | 2007 110811 | 4/2007 |
| JP | 4271397 | 6/2009 |
| JP | 2010 221856 | 10/2010 |
| JP | 4956611 | 6/2012 |
| WO | 2008 107992 | 9/2008 |
| WO | 2011 099122 | 8/2011 |
| WO | 2013 046462 | 4/2013 |
| WO | 2014 174597 | 10/2014 |

OTHER PUBLICATIONS

Japanese Office Action Issued Oct. 28, 2014 in Japanese Patent Application No. 2014-161540 (with English translation) (Total 2 Pages).

Japanese Decision of a Patent Grant Issued Jan. 20, 2015 in Japanese Patent Application No. 2014-161540 (with English translation) (Total 4 Pages).

International Search Report Issued Nov. 19, 2013 in PCT/JP2013/073578 Filed Sep. 2, 2013.

* cited by examiner

OUTPUT VOLTAGE FREQUENCY COMMAND VALUE Finv* [Hz]

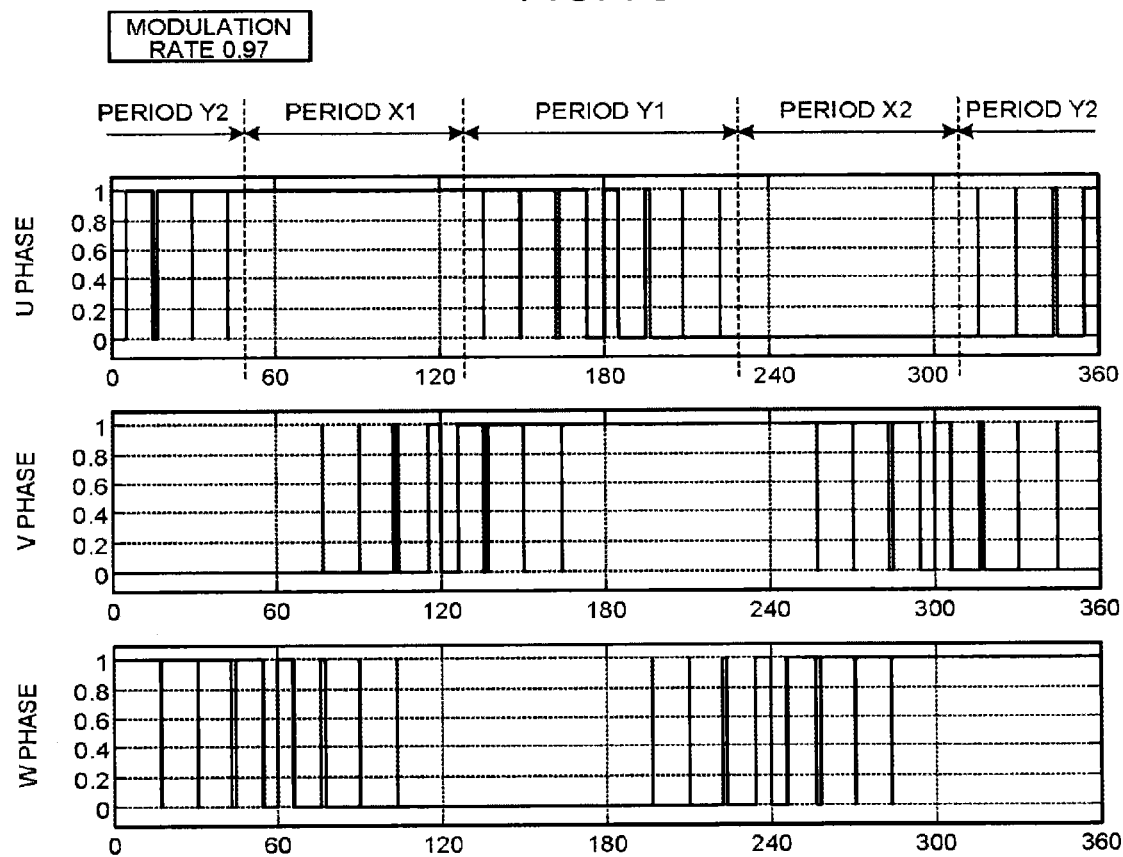

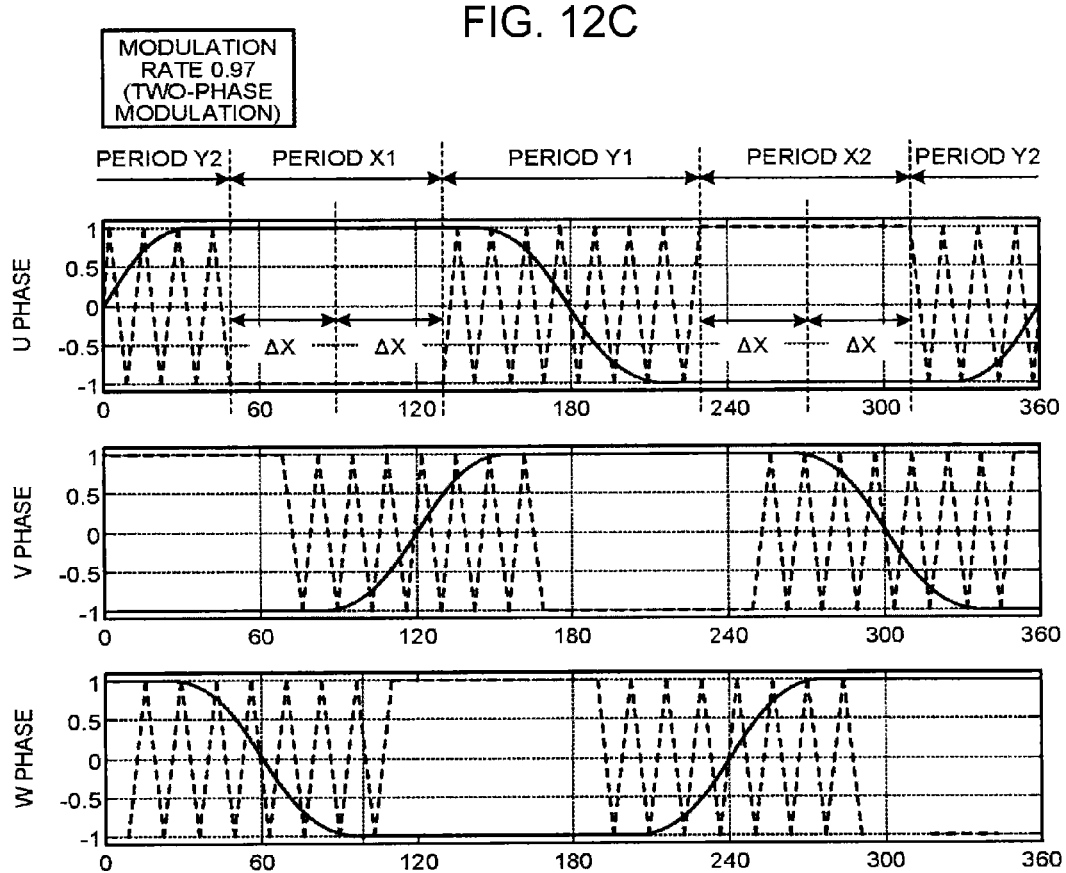

POWER CONVERTER

FIELD

The present invention relates to a power converter.

BACKGROUND

As a literature in which conventional power conversion control is described, there is, for example, Patent Literature 1. The Patent Literature 1 examines various problems that occur when a control mode of an inverter is switched; specifically, for example, a switching frequency becomes discontinuous and a tone change of magnetic noise that occurs because of the discontinuous switching frequency is harsh, and fluctuation occurs in generated torque of an electric motor. Patent Literature 1 describes a technology for solving these problems.

Note that, besides Patent Literature 1, Patent Literatures 2 to 4 and Non Patent Literatures 1 and 2 described below are also publicly-known literatures concerning the power conversion control. These literatures are referred to as appropriate in Description of Embodiments below according to necessity.

CITATION LIST

Patent Literature

Patent Literature 1: Japanese Patent No. 3700019
Patent Literature 2: Japanese Patent Publication No. H5-64036
Patent Literature 3: Japanese Patent No. 2654118
Patent Literature 4: Japanese Patent No. 3812290
Patent Literature 5: Japanese Patent Application Laid-Open No. S58-86874
Patent Literature 6: Japanese Patent No. 2566021

Non Patent Literature

Non Patent Literature 1: Hidehiko Sugimoto "Theory and Practical Design of an AC Servo System" Sogo Denshi Shuppan 1990
Non Patent Literature 2: The Institute of Electrical Engineers of Japan "Semiconductor Power Conversion Circuit" Ohmsha, Ltd.

SUMMARY

Technical Problem

In a power converter, when power conversion control is in an overmodulation state, there is a section where crossing of a modulated wave and a carrier wave does not occur. In Patent Literature 1 described above, this section is defined as "wide pulse" and a section where the crossing of the modulated wave and the carrier wave is caused is defined as "equal interval pulse". In Patent Literature 1, a pulse waveform of a PWM output is "equal interval" in the vicinity of a zero-cross of the modulated wave because the pulse waveform is based on asynchronous PWM. As described in paragraph "0012" of Patent Literature 1, "in the asynchronous PWM, the width of individual voltage pulses included in a fundamental wave one cycle of an output voltage is different for each of cycles and, when the number of pulses in the vicinity of a zero-cross of an output voltage fundamental wave decreases as the output voltage approaches 100% in an overmodulation mode, the influence of the decrease in the number of pulses becomes obvious and imbalance occurs between plus and minus of the output voltage, and a beat phenomenon occurs in a load current of an inverter". Therefore, in Patent Literature 1, a "transfer voltage" and a "transfer phase" are contrived to perform control for suppressing transient fluctuation of an electric current and torque.

However, because the number of pulses of the "equal interval pulse" is based on the asynchronous PWM, as indicated by Formula (3) of the literature, the number of pulses of the "equal interval pulse" is proportional to an asynchronous carrier frequency Fc, inversely proportional to a fundamental wave frequency Fi, and inversely proportional to a modulation rate (the amplitude of the modulated wave) A. In particular, in an overmodulation region, an operation change of the modulation rate A more greatly changes with respect to a rate of change of an output voltage command value E*. Therefore, increase and decrease fluctuation of an average number of pulses increases and fluctuation in the number of pulses in an "equal interval pulse" period increases.

Therefore, depending on limitations of a fundamental wave frequency Fi and an asynchronous carrier frequency Fc in an application in use (a generation loss and cooling performance of a power converter), a relational expression between the modulation rate A and the output voltage command E* defined by Formula (2) of the literature is not stored. There are problems in that a control error of a voltage amplitude occurs and a beat is generated to cause a sudden change and a pulsation in an inverter output current.

The present invention has been devised in view of the above and it is an object of the present invention to obtain a power converter that enables stable operation of a load in a wide voltage operation range while suppressing a sudden change and a pulsation of an inverter output current.

Solution to Problem

In order to solve the aforementioned problems, a power converter according to one aspect of the present invention is constructed in such a manner as to include: an inverter circuit that converts a direct-current voltage into a multiphase alternating-current voltage and outputs the alternating-current voltage; and a switching-signal generating unit that calculates, on the basis of an alternating-current voltage output amplitude command value and an alternating-current voltage output phase angle command value, a gate signal for driving the inverter circuit and outputs the gate signal to the inverter circuit, wherein the switching-signal generating unit fixes, in one cycle of an alternating-current voltage output command, the gate signal to always output a direct-current input positive side terminal voltage value of the inverter circuit in a first period (X1) centering on a first phase angle ($\theta$1) for higher potential, fixes the gate signal to always output a direct-current input negative side terminal voltage value of the inverter circuit in a second period (X2) centering on a second phase angle ($\theta$2: $\theta$2>$\theta$1) for lower potential, generates the gate signal in which a first ratio by a third period (Y1), which is obtained by excluding the first and second periods (X1 and X2) from a period between the first phase angle ($\theta$1) and the second phase angle ($\theta$2), and the first period (X1) and a second ratio by a fourth period (Y2), which is obtained by excluding the first and second periods (X1 and X2) from a period between the second phase angle ($\theta$2) and a phase angle ($\theta$1+360) obtained by shifting the first phase angle ($\theta$1) 360 degrees in a positive direction, and the second period X2 are set on the basis of a modulation rate command or an alternating-current voltage output amplitude command value, and maintains, as a phase angle command condition of gate signals in the third and fourth periods (Y1 and Y2), in the third period (Y1), a ratio of a phase angle for turning on and off the gate signal and an average (($θ1+θ2$)/2) of the first and second phase angles ($θ1$ and $θ2$), and maintains, in the fourth period (Y2), a ratio of a phase angle for turning on and off the gate signal and a phase angle (($θ1+θ2$)/2+180) obtained by shifting a phase angle of an average 180 degrees.

Advantageous Effects of Invention

According to the present invention, there is an effect that it is possible to perform stable operation of a load in a wide voltage operation range while suppressing a sudden change and a pulsation of an inverter output current.

BRIEF DESCRIPTION OF DRAWINGS

FIG. 7B is a diagram showing waveform of gate signals in the overmodulation PWM mode (the modulation rate is 0.97).

FIG. 12C is a diagram showing waveforms of a modulated wave and a carrier wave in the overmodulation preparation mode (the modulation rate is 0.97) during the two-phase modulation execution.

DESCRIPTION OF EMBODIMENTS

Exemplary embodiments of the present invention are explained below with reference to the accompanying drawings. Note that the present invention is not limited by the embodiments explained below.

First Embodiment

Figure 1:
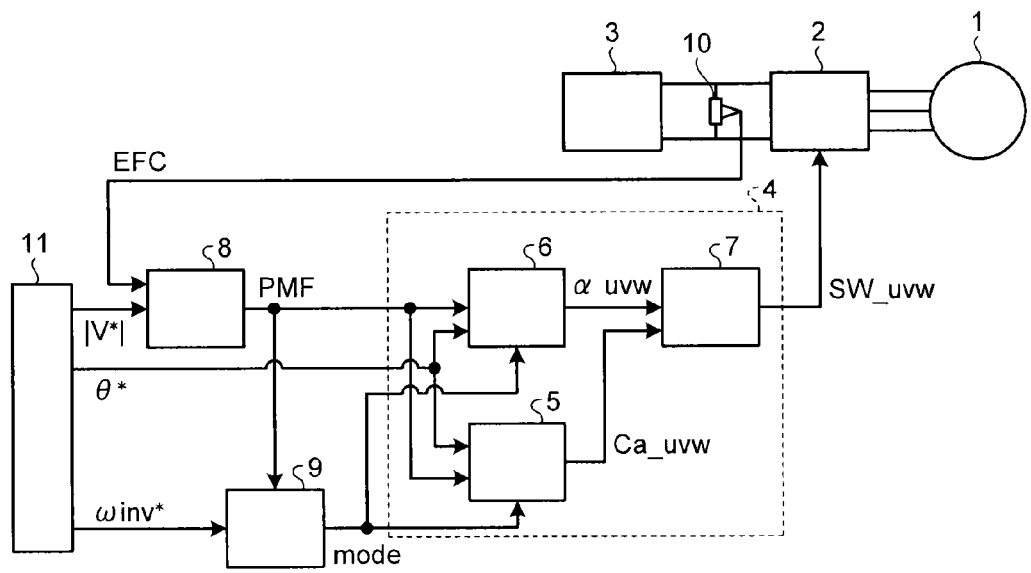
FIG. 1 is a block diagram showing the configuration of a power converter in a first embodiment.

FIG. 1 is a diagram showing the configuration of a power converter in a first embodiment. As shown in the figure, the power converter in the first embodiment includes, as components for driving an alternating-current electric motor 1, which is a load, an inverter circuit 2, a direct-current-voltage source unit 3, a switching-signal generating unit 4 including a carrier-wave generating unit 5, a modulated-wave generating unit 6, and a comparing unit 7, a modulation-rate calculating unit 8, a modulation-mode selecting unit 9, a voltage detecting unit 10, and an alternating-current-voltage-command generating unit 11.

The inverter circuit 2 includes a not-shown semiconductor switch element and has a function of converting direct-current power supplied from the direct-current-voltage source unit 3 into alternating-current power having a variable voltage and a variable frequency and supplying electric power to the alternating-current electric motor 1. For a modulation rate calculation explained below, the voltage detecting unit 10 detects a direct-current voltage value output from the direct-current-voltage source unit 3 and outputs the direct-current voltage value to the modulation-rate calculating unit 8.

The power converting operation in the inverter circuit 2 is performed by driving a plurality of semiconductor switch elements configuring the inverter circuit 2 according to a plurality of gate signals, which are switching signals, generated by the switching-signal generating unit 4.

The alternating-current-voltage-command generating unit 11 generates command values related to an amplitude, a phase, and a frequency in an alternating-current voltage applied to the alternating-current electric motor 1 by the inverter circuit 2. The switching-signal generating unit 4 generates a gate signal for controlling the inverter circuit 2 on the basis of a signal output from the alternating-current-voltage-command generating unit 11 directly or via the modulation-rate calculating unit 8 and the modulation-mode selecting unit 9 and outputs the gate signal. Specifically, the modulated-wave generating unit 6 outputs a modulated wave, which is an alternating-current waveform signal based on a voltage command, as a signal. The carrier-wave generating unit 5 outputs a carrier wave based on a saw tooth wave or a triangular wave as a signal. The carrier wave signal and the modulated wave signal are input to the comparing unit 7. The comparing unit 7 outputs the gate signal to the inverter circuit 2 on the basis of various magnitude relations that change at every moment.

For example, when the inverter circuit 2 is a two-level inverter, as the gate signal output to the inverter circuit 2, signals described below corresponding to the magnitude relations between the modulated wave and the carrier wave are generated.

(i) A Period in which the Modulated Wave>the Carrier Waver
Higher potential of a direct-current voltage input is selected as the gate signal.

(ii) A Period in which the Modulated Wave<the Carrier Wave
Lower potential of the direct-current voltage input is selected as the gate signal.

Note that, when the alternating-current electric motor is of a multiphase alternating-current, signals corresponding to each of the phases are generated as the modulated wave. Comparison of the carrier wave and the modulated wave is performed for the respective phases. Consequently, gate signals corresponding to the respective phases are generated and output to the inverter circuit 2.

In this way, the gate signals generated by the switching-signal generating unit 4 are output to the inverter circuit 2. So-called pulse width modulation (hereinafter abbreviated as "PWM") is performed, direct-current power is converted into multiphase alternating-current power, and an alternating-current load such as an alternating-current electric motor is driven.

Note that the control explained above is a publicly-known technology, and a detailed content of the control is described in, for example, Non Patent Literature 1 described above. Therefore, further explanation of the control is omitted.

The operations of the modulation-mode selecting unit 9, and the carrier-wave generating unit 5 and the modulated-wave generating unit 6 included in the switching-signal generating unit 4, and a relation between the switching-signal generating unit 4 and the modulation-rate calculating unit 8 are explained.

First, the modulation-rate calculating unit 8 calculates a modulation rate PMF according to the following formula from an output voltage value EFC of the direct-current-voltage source unit 3 detected by the voltage detecting unit 10 and an alternating-current voltage output amplitude command value |V|* generated by the alternating-current-voltage-command generating unit 11 to operate the alternating-current electric motor 1.

$$PMF = \frac{2}{\pi} \cdot \frac{|V|*}{EFC} \quad (1.1)$$

Note that, the alternating-current voltage output amplitude command value |V|* in Formula (1.1) is a peak value of a neutral point voltage in a three-phase alternating current and is a definition formula for defining a maximum voltage capable of being output by the inverter circuit as the modulation rate PMF "1" during one-pulse mode (180 deg energization) explained below.

Figure 2:
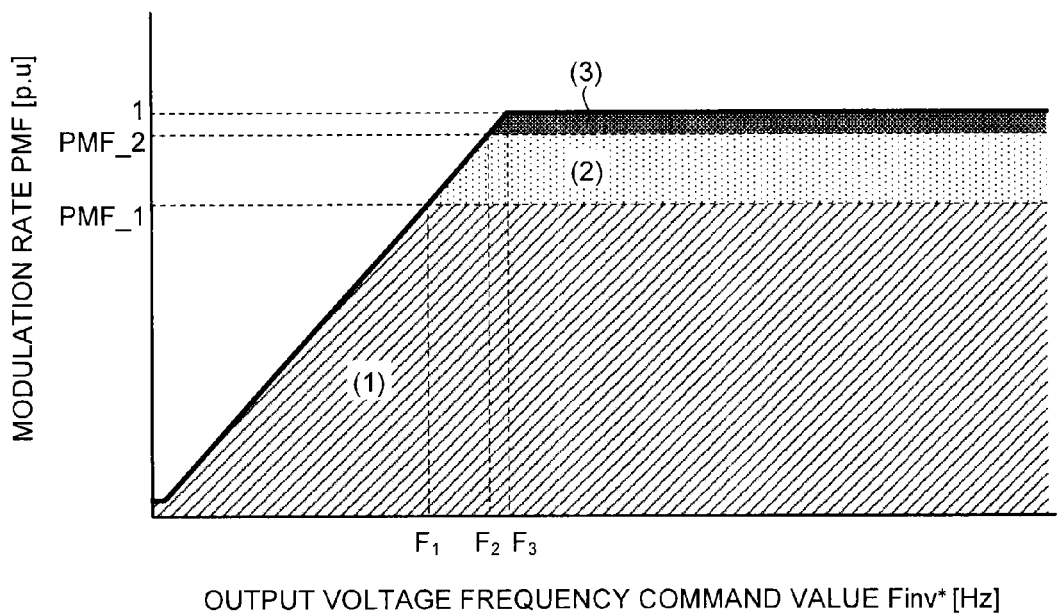
FIG. 2 is a diagram showing a mode selection method in the first embodiment of a modulated-wave selecting unit.

According to the modulation rate PMF by Formula (1.1), the modulation-mode selecting unit 9 selects any one of modulation modes of (1) to (3) shown in Table 1 below. A relation between this selection method and operation conditions is shown in FIG. 2. FIG. 2 is a typical example in which an output of the inverter circuit 2 is an alternating-current electric motor. The ordinate represents the modulation rate PMF and the abscissa represents an output voltage frequency command value FinV*. FinV* is substantially proportional to rotating speed of the alternating-current electric motor 1. However, when FinV*≥F3, the modulation rate is fixed at a maximum 1.0 and transitions.

TABLE 1

Modulation mode selection conditions

| Modulation rate condition | Frequency condition | Modulation mode to be selected |
| --- | --- | --- |
| PMF ≤ PMF_1 | Finv ≤ F1 | (1) Asynchronous PWM mode |
| PMF_1 < PMF ≤ PMF_2 | F1 < Finv ≤ F2 | (2) Overmodulation PWM mode |
| PMF_2 < PMF | F2 < Finv | (3) Three-dash pulse mode (during a modulation rate 100%: one-pulse mode) |

A discrimination condition for mode selection in the modulation-mode selecting unit 9 is based on a modulation rate range. When an electric motor is driven, in general, as shown in Table 1 or FIG. 2, the output voltage frequency command value FinV* and the modulation rate PMF at stationary time are in a proportional relation in a certain section. Therefore, depending on a value of FinV*, the discrimination condition for the mode selection can also be substantially the same function. However, the magnitude of the modulation rate PMF is also proportional to a transient magnetic flux amount during a magnetic flux rising edge such as a start time of the inverter circuit 2 and the alternating-current electric motor 1. Therefore, it is made possible to perform finer modulation mode selection conforming to actual operation if the mode selection is performed according to the modulation rate PMF. The modulation-mode selecting unit 9 outputs a mode selected as shown in Table 1 and FIG. 2 to the switching-signal generating unit 4 as a modulation mode signal (mode).

Figure 3:
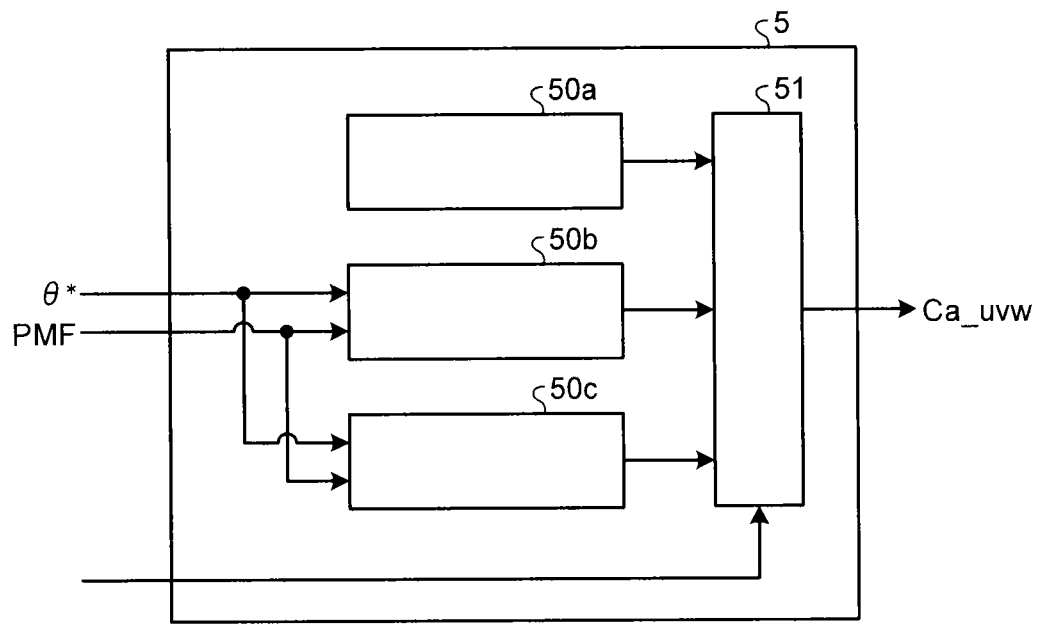
FIG. 3 is a block diagram showing the configuration of a carrier-wave generating unit in the first embodiment.
Figure 4:
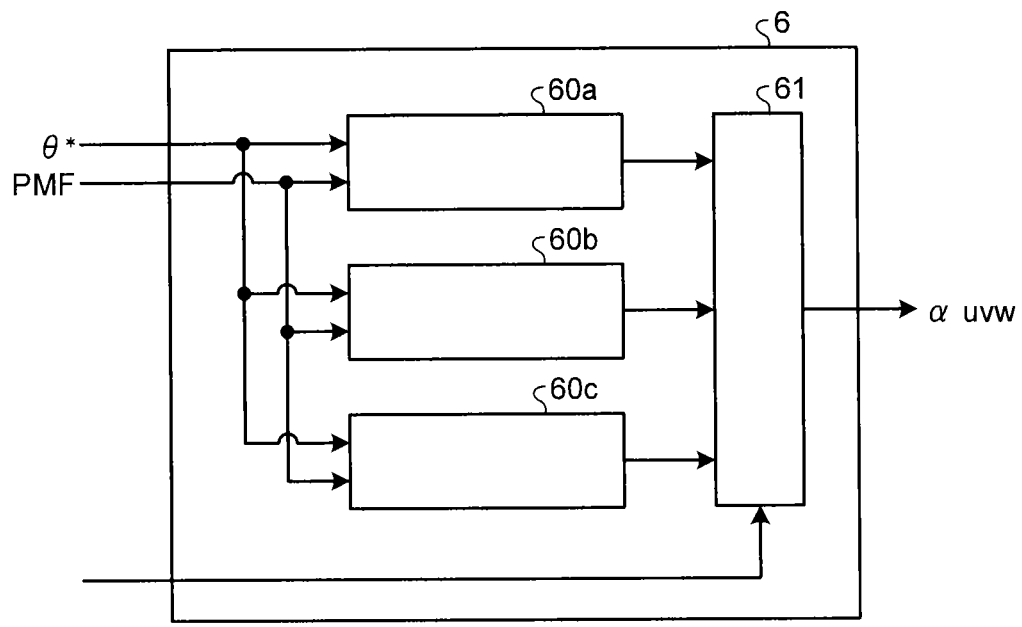
FIG. 4 is a block diagram showing the configuration of a modulated-wave generating unit in the first embodiment.

The operation of the switching-signal generating unit 4 (the carrier-wave generating unit 5 and the modulated-wave generating unit 6) corresponding to the modulation mode signal is explained. As shown in FIG. 3 and FIG. 4, the carrier-wave generating unit 5 and the modulated-wave generating unit 6 respectively include generating units for carrier waves and modulated waves for modulation modes.

<The Modulation Mode Signal: in the Case of an Asynchronous PWM Mode>

A carrier-wave-for-asynchronous-PWM generating unit 50a calculates and outputs a carrier wave not depending on an output voltage phase angle command value θ*, for example, a triangular wave having a fixed cycle of 1 kHz and an amplitude 1. When an asynchronous PWM mode in a region (1) is input as the modulation mode signal, the asynchronous PWM mode is output as an output of the carrier-wave generating unit 5 according to output switching in the carrier-wave selecting unit 51.

On the other hand, a modulated-wave-for-asynchronous-PWM generating unit 60a calculates and outputs, for example, a carrier wave signal indicated by Formula (1.2) or Formula (1.3) below according to the output voltage phase angle command value θ* and the modulation rate PMF.

When the asynchronous PWM mode in the region (1) is input as the modulation mode signal, the asynchronous PWM mode is output as an output of the modulated-wave generating unit 6 according to output switching in the modulated-wave selecting unit 61.

$$\begin{pmatrix} \alpha u \\ \alpha v \\ \alpha w \end{pmatrix} = \frac{4}{\pi} \cdot PMF \cdot \begin{pmatrix} \sin\theta* \\ \sin\left(\theta* - \frac{2}{3}\pi\right) \\ \sin\left(\theta* + \frac{2}{3}\pi\right) \end{pmatrix} \quad (1.2)$$

$$\begin{pmatrix} \alpha u \\ \alpha v \\ \alpha w \end{pmatrix} = \frac{4}{\pi} \cdot PMF \cdot \begin{pmatrix} \sin\theta* + \frac{1}{6} \cdot \sin(3\theta*) \\ \sin\left(\theta* - \frac{2}{3}\pi\right) + \frac{1}{6} \cdot \sin(3\theta*) \\ \sin\left(\theta* + \frac{2}{3}\pi\right) + \frac{1}{6} \cdot \sin(3\theta*) \end{pmatrix} \quad (1.3)$$

Note that, in Formula (1.3) above, a sine wave three times as large as the output voltage phase angle command value θ* is superimposed. However, other signals can be superimposed as long as the signals are common to each of the phases.

A carrier wave and a modulated wave obtained in this way are subjected to comparison processing in the comparing unit 7 for each of the phases according to a magnitude relation between the carrier wave and the modulated wave, for example, as in (i) and (ii) explained above, and output to the inverter circuit 2 as a switching command for each of the phases to drive an inverter. This processing is also a publicly-known inverter driving technology described in Non Patent Literature 1 described above.

<The Modulation Mode Signal: in the Case of an Overmodulation PWM Mode>

Figure 5A:
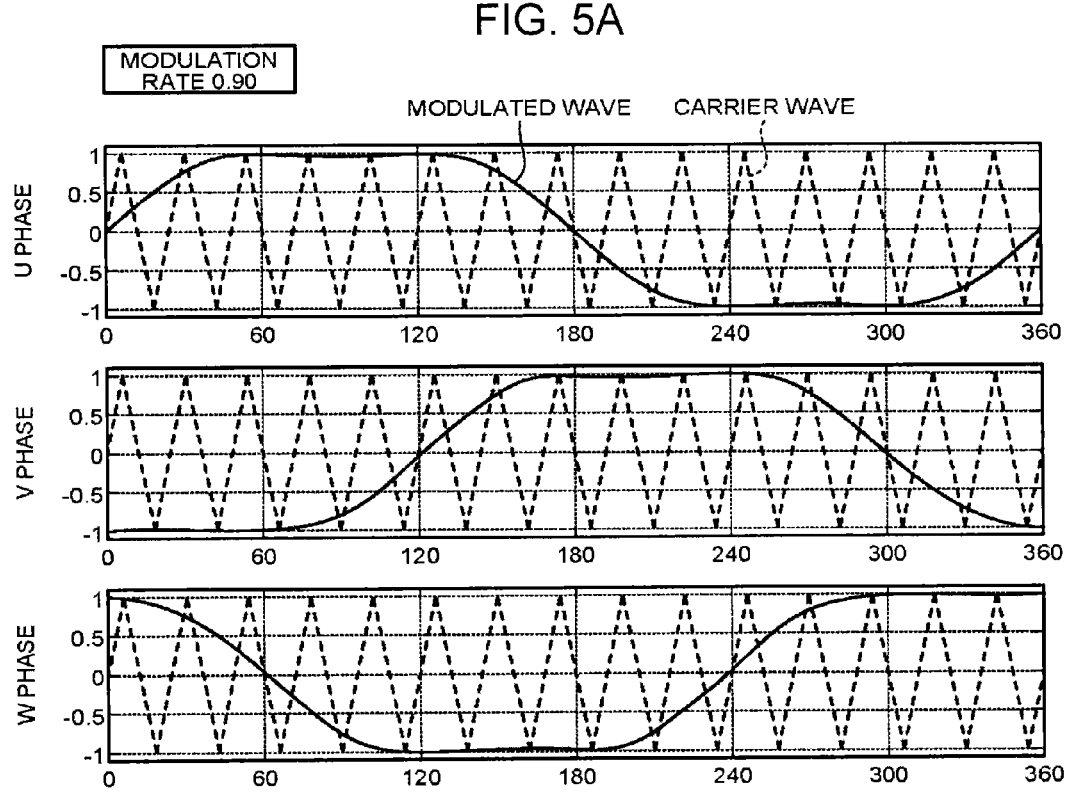
FIG. 5A is a diagram showing waveforms of a modulated wave and a carrier wave in an overmodulation PWM mode (a modulation rate is 0.9).
Figure 6A:
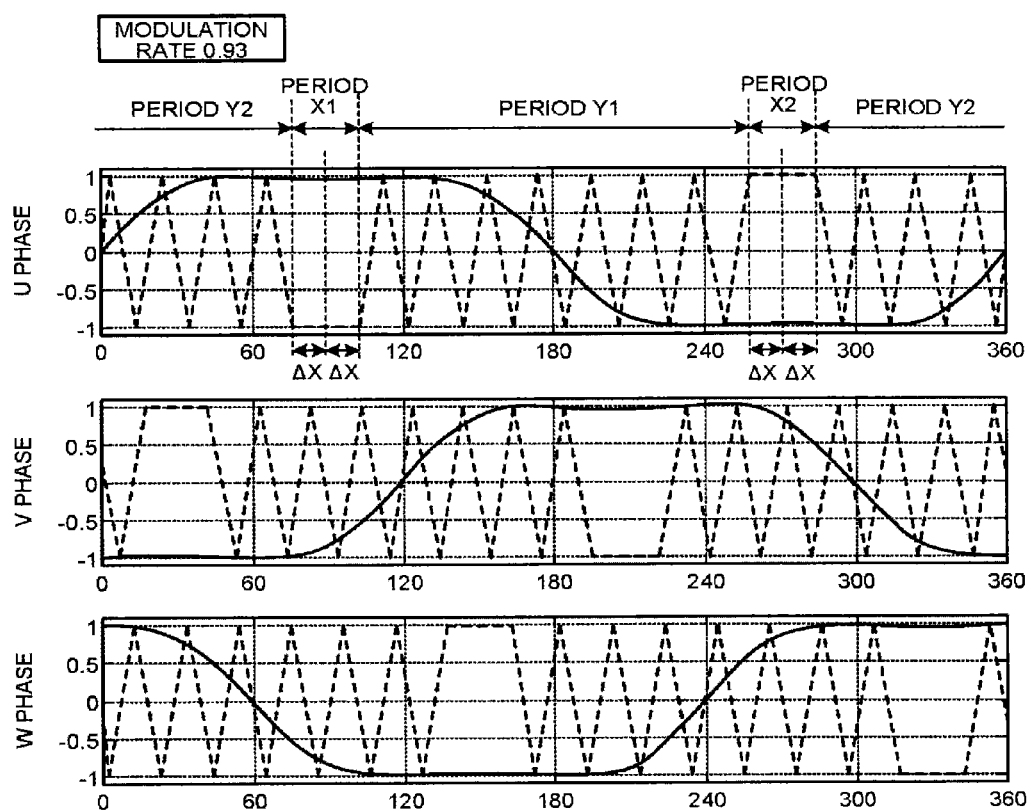
FIG. 6A is a diagram showing waveforms of a modulated wave and a carrier wave in the overmodulation PWM mode (the modulation rate is 0.93).
Figure 7A:
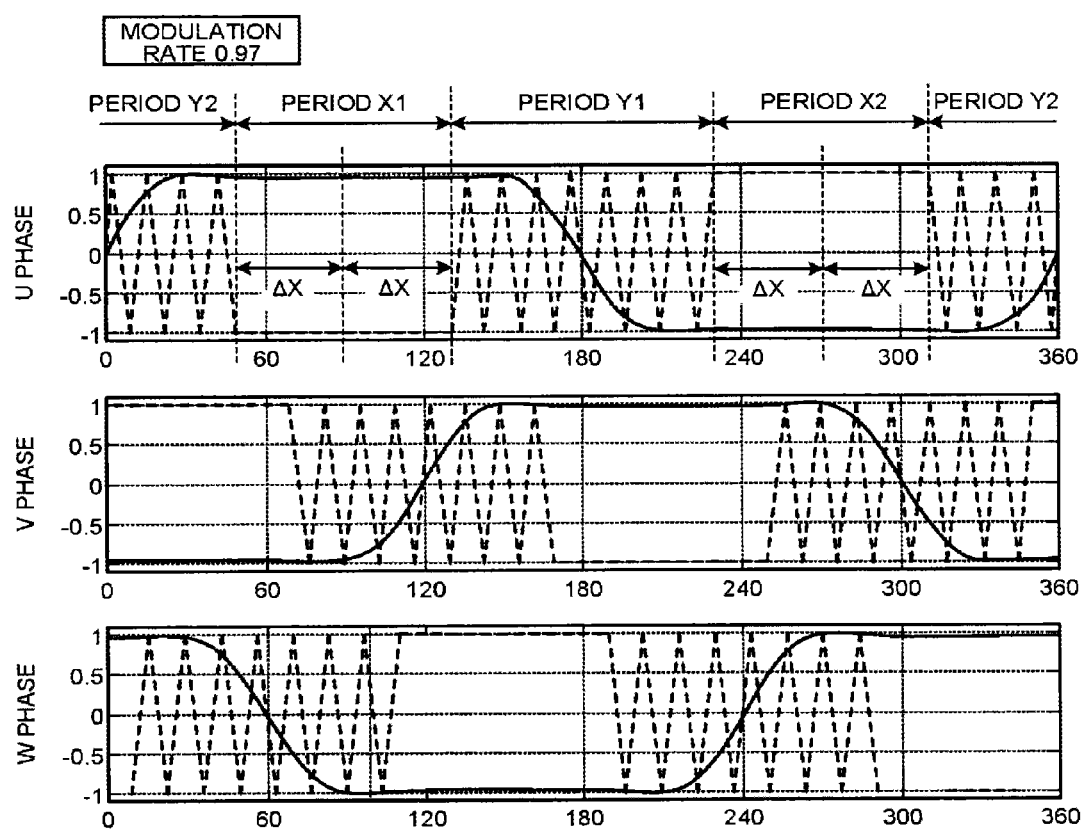
FIG. 7A is a diagram showing waveforms of a modulated wave and a carrier wave in the overmodulation PWM mode (the modulation rate 0.97).

An overmodulation PWM mode, which is the greatest characteristic of this application, is explained. FIG. 5A, FIG. 6A, and FIG. 7A show, in the cases in which the modulation rate PMF is 0.9, 0.93, and 0.97, a carrier wave output by the carrier-wave-for-overmodulation-PWM generating unit 50b and a modulated wave output by the modulated-wave-for-overmodulation-PWM generating unit 60b.

Figure 5B:
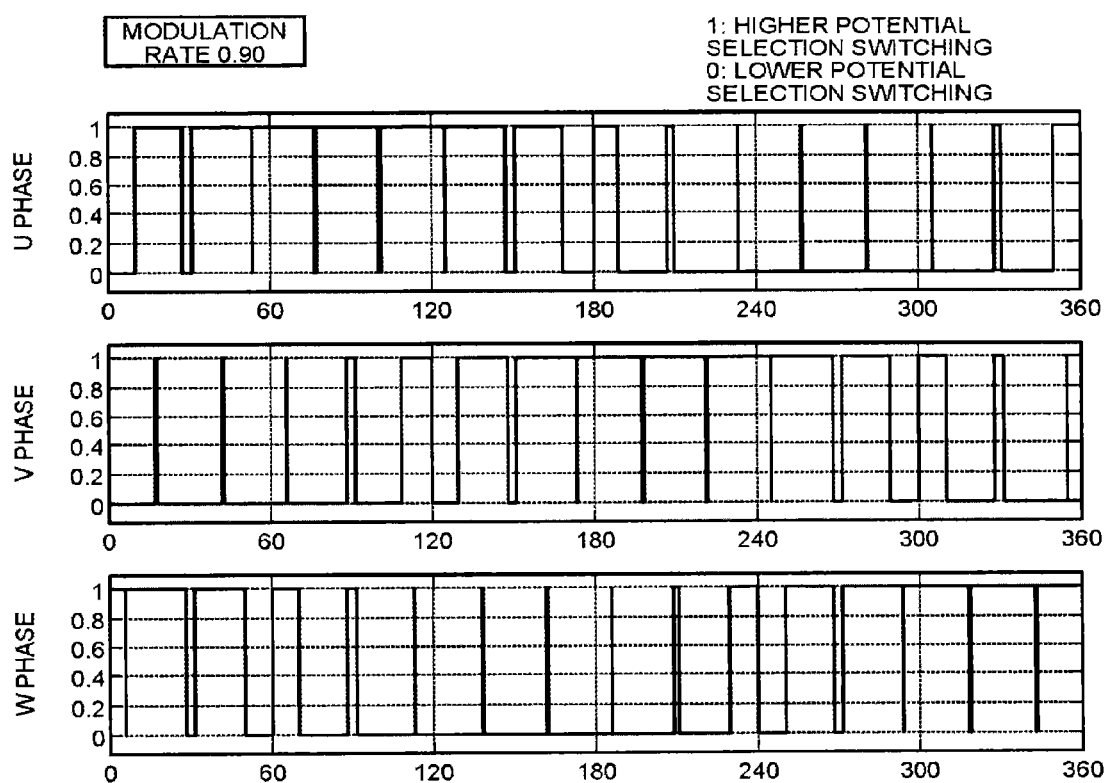
FIG. 5B is a diagram showing waveforms of gate signals in the overmodulation PWM mode (the modulation rate is 0.9).
Figure 6B:
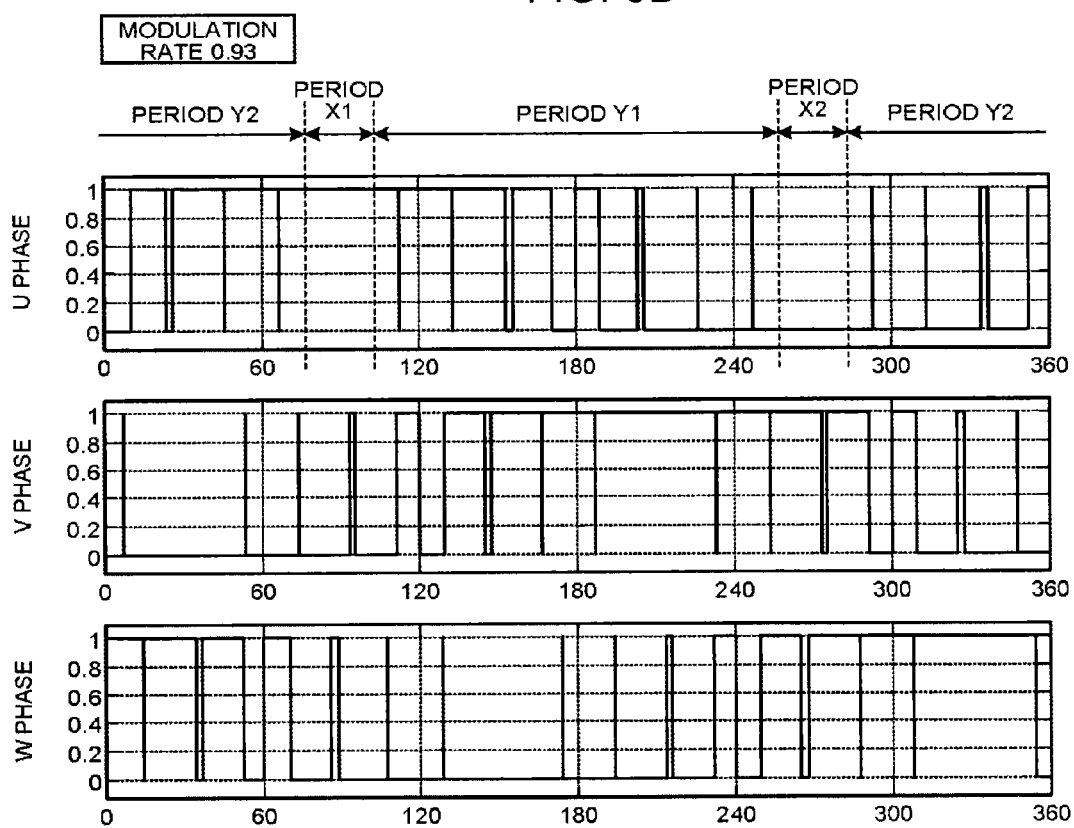
FIG. 6B is a diagram showing waveforms of gate signals in the overmodulation PWM mode (the modulation rate is 0.93).

FIG. 5B, FIG. 6B, and FIG. 7B show results obtained by comparing, in the comparing unit 7, the outputs of the carrier-wave-for-overmodulation-PWM generating unit 50b and the modulated-wave-for-overmodulation-PWM generating unit 60b shown in FIG. 5A, FIG. 6A and FIG. 7A and changing the outputs to gate signals. A value of a period in which higher potential of a direct-current voltage input is selected is "1" and a value of a period in which lower potential of the direct-current voltage input is selected is "0". The inverter circuit 2 performs ON/OFF control of semiconductor switch elements of each of the phases according to the gate signals of the phases.

The detailed operations of the carrier-wave-for-overmodulation-PWM generating unit 50b and the modulated-wave-for-overmodulation-PWM generating unit 60b are explained.

(iii) In the Case of the Modulation Rate PMF=PMF_1 (FIGS. 5A and 5B)

When the modulation rate PMF=π/(2√3)=0.9069 is substituted in Formula (1.3), peak values of modulated waves of respective UVW phases are approximately 1. That is, a maximum modulation rate at which the modulated wave can be compared with a carrier wave, which is a triangular wave having a maximum value "+1" and a minimum value "−1", and modulation can be performed is near 0.9. A modulation method for obtaining a higher modulation rate (a higher output voltage amplitude) than PWM performed by comparing a normal carrier wave of a triangular wave or a saw tooth wave and a modulated wave is called overmodulation. Therefore, a lower limit value in a use modulation rate range of the overmodulation PWM mode in the first embodiment, that is, PMF_1 in Table 1 is set as indicated by the following formula.

$$PMF\_1=\pi/(2\sqrt{3})=0.9069 \quad (1.4)$$

At this point, the carrier-wave-for-overmodulation-PWM generating unit 50b calculates and outputs a carrier wave referring to the output voltage phase angle command value θ* so as to synchronize the carrier wave with a modulated wave generated by the modulated-wave-for-overmodulation-PWM generating unit 60b. More specifically, the carrier-wave-for-overmodulation-PWM generating unit 50b generates a synchronous carrier wave such that an even number of harmonics do not occur in a pulse waveform of a modulation result and a zero-cross phase of the carrier wave and a zero-cross phase of the modulated wave overlap. In an example shown in FIG. 5A, the carrier-wave-for-overmodulation-PWM generating unit 50b calculates and outputs the carrier wave to generate a triangular wave of 15 cycles in synchronization with the carrier wave per one cycle of the modulated wave. Consequently, it is possible to smooth transition to an operation condition at a higher modulation rate explained below.

(iv) In the case of the modulation rate PMF=0.93 and 0.97 (FIGS. 6A and 6B and FIGS. 7A and 7B).

FIG. 6A shows a carrier wave and a modulated wave in the case of the modulation rate PMF=0.93 in the first embodiment. As explained below, a diagram of a result of defining periods X1, X2, Y1, and Y2 for each of the phases is shown.

The period X1 is a period in which, when the modulated wave is defined by Formula (1.3), in periods of ±Δx centering on a U phase θ*=90 [deg], a V phase θ*=210 [deg], and a W phase θ*=330 [deg], the carrier wave and the modulated wave are fixed and upper sides in phase arms of the inverter circuit continue to be ON. As the modulation rate is larger, the period X1(Δx) is longer. Note that, in the case of PMF=PMF_1, Δx=0 [deg] and a period width 2Δx of X1 is also 0.

The period X2 is a period in which, when the modulated wave is defined by Formula (1.3), in periods of ±Δx centering on a U phase θ*=270 [deg], a V phase θ*=30 [deg], and a W phase θ*=150 [deg], the carrier wave and the modulated wave are fixed and lower sides in the phase arms of the inverter circuit continue to be ON. As the modulation rate is larger, the period X2 is longer. The lengths of the periods are X1=X2 as long as the modulation rate and the frequency conditions are the same. Note that, in the case of PMF=PMF_1, Δx=0 [deg] and a period width 2Δx of X2 is also 0.

The period Y1 is a period between the period X1 and the period X2. In this period, in the abscissa (θ*) direction, both of the modulated wave and the carrier wave have waveforms reduced according to the increase in the modulation rate.

The period Y2 is a period between the period X2 and the period X1. In this period, in the abscissa (θ*) direction, both of the modulated wave and the carrier wave have waveforms reduced according to the increase in the modulation rate.

Calculated signals calculated by the carrier-wave-for-overmodulation-PWM generating unit 50*b* explained above are summarized in Table 2 below.

TABLE 2

Calculated signals (U phase) of the carrier-wave-for-overmodulation-PWM generating unit 50b

| Period | Signal to be calculated |
|---|---|
| Y2 | A triangular wave signal synchronizing with the modulated wave is reduced to (90 − Δx) [deg]/90[deg] centering on θ* = 0[deg] |
| X1 | Always "−1" |
| Y1 | A triangular wave signal synchronizing with the modulated wave is reduced to (90 − Δx) [deg]/90[deg] centering on θ* = 180[deg] |
| X2 | Always "1" |

Note that, in Table 2 above, only the calculated signals of the U phase are shown. However, concerning carrier waves for the V phase and the W phase, waveforms obtained by shifting the carrier wave of the U phase respectively by 120 [deg] and 240 [deg] with reference to θ* are calculated signals of the V phase and the W phase.

Calculated signals calculated by the modulated-wave-for-overmodulation-PWM generating unit 60*b* are summarized in Table 3 below. In Table 3, αu_x1, αu_x2, αu_y1, and αu_y2 are respectively signals calculated in the periods X1, X2, Y1, and Y2.

TABLE 3

Calculated signals (U phase) of the modulated-wave-for-overmodulation-PWM generating unit 60b

| Period | Signal to be calculated |
|---|---|
| Y2 | The modulated wave (αu of Formula 1.3) set as PMF = PMF_1π/(2√3) is reduced by (90 − Δx) [deg]/90[deg] centering on 0 [deg] $$\alpha u\_y2(\theta^*, \Delta x) = \frac{4}{\pi} \cdot PMF\_1 \cdot \sin\left(\frac{\pi/2}{\pi/2 - \Delta x} \cdot \theta^*\right) + \frac{1}{6} \cdot \sin\left(\frac{\pi/2}{\pi/2 - \Delta x} \cdot 3\theta^*\right)$$ |
| X1 | If combined with the carrier wave in Table 2, any value equal to or larger than −1 is acceptable. In examples in FIG. 6A and FIG. 7A, continuity of the modulated wave is secured by fixing au_y2 (θ* = π/2, Δx = 0) = 0.9623 |
| Y1 | The modulated wave (αu of Formula 1.3) set as PMF = PMF_1π/(2√3) is reduced by (90 − Δx) [deg]/90[deg] centering on 0 [deg] Making use of symmetry, $$\alpha u\_y1(\theta^*, \Delta x) = -\alpha u\_y2(\theta^* - \pi, \Delta x) = -\frac{4}{\pi} \cdot PMF\_1 \cdot \sin\left(\frac{\pi/2}{\pi/2 - \Delta x} \cdot (\theta^* - \pi)\right) - \frac{1}{6} \cdot \sin\left(\frac{\pi/2}{\pi/2 - \Delta x} \cdot 3 \cdot (\theta^* - \pi)\right)$$ |
| X2 | If combined with the carrier wave in Table 2, any value equal to or smaller than 1 is acceptable. In examples in FIG. 6A and FIG. 7-1, continuity of the modulated wave is secured by fixing au_y2 (θ* = −π/2, Δx = 0) = 0.9623 |

Note that, in Table 3 above, only the calculated signals of the U phase are shown. However, concerning modulated waves for the V phase and the W phase, waveforms obtained by shifting the modulated wave of the U phase respectively by 120 [deg] and 240 [deg] with reference to θ* are calculated signals of the V phase and the W phase.

In Table 3 above, a switching stop period Δx is a function of the modulation rate PMF. Ideally, when PMF=PMF_1, Δx=0 [deg] and, when PMF=1.0, Δx=90[deg] (180 [deg] energization, the one-pulse mode).

Note that, concerning Δx, the carrier wave and the modulated wave can be calculated by sequentially substituting the modulation rate PMF in a function or can be calculated by converting functions into map data in advance, referring to the map data according to the modulation rate PMF, and substituting a reference value in the formulas of Tables 2 and 3. A switching command obtained as a result of comparing, in the comparing unit 7, the carrier waves and the modulated waves calculated in this way is FIG. 6B (PMF=0.93) and FIG. 7B (PMF=0.97).

When the carrier waves and the modulated waves are calculated as shown in Tables 2 and 3, even at the modulation rate exceeding PMF_1, which is the modulation rate upper limit value of the normal triangular wave comparison system, explained in the section (i) above, it is possible to carry out smooth overmodulation.

<The Modulation Mode Signal: in the Case of a Three-Dash Pulse Mode>

Finally, a three-dash pulse mode selected in a region where the modulation rate is high, for example, when the modulation rate is equal to or higher than 0.97 is explained.

Figure 8:
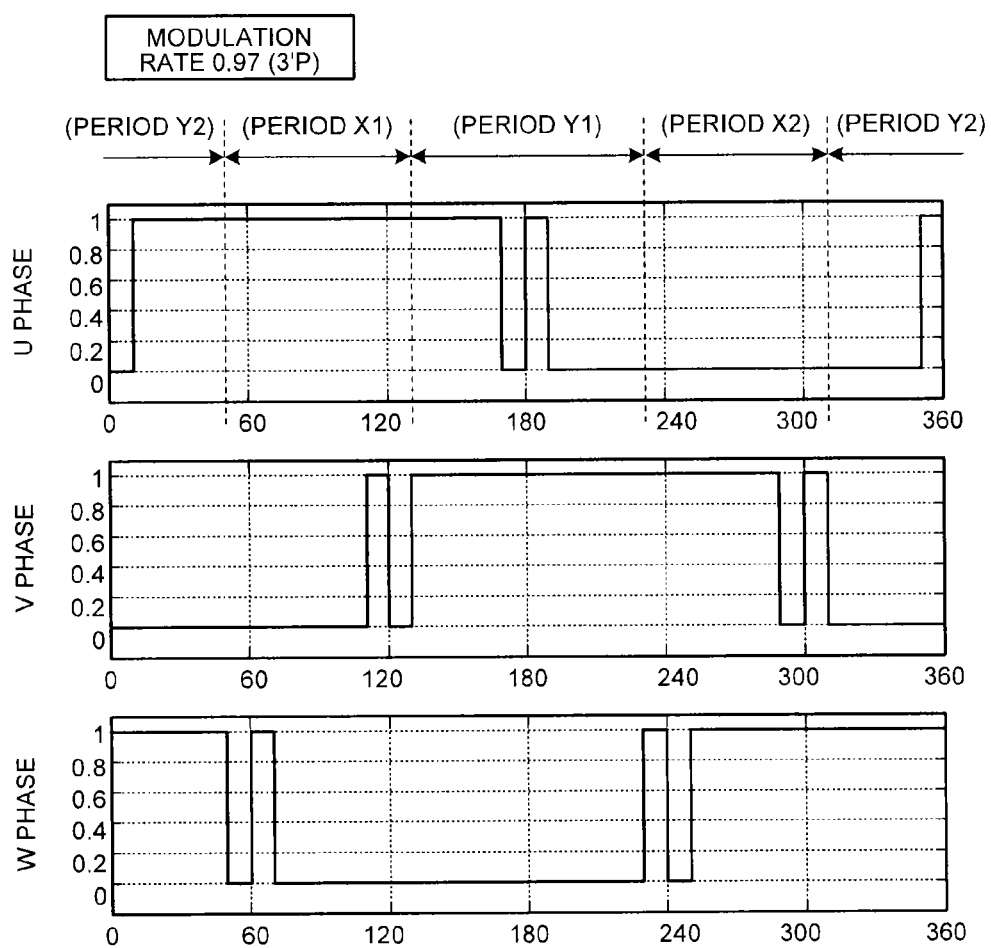
FIG. 8 is a diagram showing waveform of gate signals in a three-dash pulse mode (the modulation rate is 0.97).

The three-dash pulse mode is a pulse mode in which, in the explanation of the overmodulation mode in (2) above, switching is performed only three times (ON→OFF→ON or OFF→ON→OFF) in a period Y (Y1 and Y2) of each of the phases. An example of this switching pattern is shown in FIG. 8. When the three-dash pulse mode of a region (3) is selected by the modulation-mode selecting unit 9, a carrier-wave-for-three-dash-pulse generating unit 50*c* and a modulated-wave-for-three-dash-pulse generating unit 60*c* are selected, and outputs of the carrier-wave-for-three-dash-pulse generating unit 50*c* and the modulated-wave-for-three-dash-pulse generating unit 60*c* are compared to obtain the switching pattern shown in FIG. 8. Note that a generation method for the three-dash pulse mode in the two-level inverter is a publicly-known technology as described in Patent Literature 2 and Patent Literature 3 above. More detailed explanation of the generation method is omitted.

In the first embodiment, the three-dash pulse mode is selected under a condition that the modulation rate is close to 1. This is because of the reason explained below.

As explained above, in the overmodulation PWM mode in the region (3) in this application, in the switching waveforms of the respective phases, there are the period X in which the switching is stopped by setting always ON or always OFF and the period Y in which the switching control of ON/OFF is performed. A ratio of the period Y decreases as the modulation rate PMF (the alternating-current voltage output amplitude command value |V|*) increases.

In the inverter circuit 2, in a semiconductor element unit, a loss corresponding to the switching and heat generation involved in the switching occur. Therefore, in a range in which there is no problem in control of an output voltage, it is more advantageous in cooling design if the number of switchings is smaller. In a real semiconductor element, time necessary for one switching is physically not 0 (in the case of an IGBT in recent years, approximately several hundred nanoseconds to several microseconds). Therefore, it is difficult to generate a pulse of a short time at random. Therefore, in the overmodulation mode, there is limitation in apparatus design to set the modulation rate close to 1 and generate a large number of pulses in an extremely short period Y.

On the other hand, in the overmodulation PWM mode, when the modulation rate PMF (the alternating-current voltage output amplitude command value |V|*) increases and the ratio of the period Y decreases, for waveforms (a fundamental wave and a harmonic) of an actual output voltage PWM waveform by the switching, the influence of the switching operation in the Y period decreases and a waveform difference from the three-dash pulse mode and a difference in distribution characteristics of contained harmonics decrease. Therefore, if the modulation mode shifts from the overmodulation mode in the region (2) to the three-dash pulse mode in the region (3) under the condition that the period Y is short, it is made possible to perform the mode switching with changes of both of the fundamental wave and the harmonic suppressed. In the three-dash pulse mode, when the modulation rate reaches 100%, that is, the period Y is 0, it is made possible to smoothly transition to the one-pulse control.

As it is understood from the above explanation, under the condition that the modulation rate is close to 1, as a specific example, the modulation rate is 97% or more, if the modulation mode is shifted from the overmodulation mode in the region (2) to the three-dash pulse mode in the region (3), it is made possible to smoothly transition an actual output voltage amplitude from an output voltage amplitude equivalent to the modulation rate of 97% or less to an output voltage amplitude equivalent to the modulation rate of 100% while observing an apparatus limitation that a short pulse is not generated.

As explained above, with the power converter in the first embodiment, as the gate signals to the phases, in one cycle of the alternating-current-voltage output command, in the period X1 centering on the phase angle θ1 for the higher potential, the gate signal is fixed to always output the direct-current input positive side terminal voltage value of the inverter circuit 2. In the period X2 centering on the phase angle θ2 for the lower potential, the gate signal is fixed to always output the direct-current input negative side terminal voltage value of the inverter circuit 2. The gate signal is output in which the ratio (a first ratio) of the period Y1, which is obtained by excluding the periods X1 and X2 from the period between the phase angle θ1 and the phase angle θ2, and the period X1 and the ratio (a second ratio) of the period Y2, which is obtained by excluding the periods X1 and X2 from a period between the phase angle θ2 and a phase angle θ1+360 [deg] and the period X2 are set on the basis of the modulation rate command PMF or the alternating-current voltage output amplitude command value |V|*. Therefore, even in a so-called overmodulation control region, it is made possible to improve following performance to a change in the alternating-current voltage output amplitude command.

Note that, if, in the period X1, the magnitude of the modulated wave is fixed to an upper limit value or more of the carrier wave and, in the period X2, the magnitude of the modulated wave is fixed to a lower limit value or less of the carrier wave, in the overmodulation control region, it is made possible to further improve the following performance to the alternating-current voltage output amplitude command change.

If values of the carrier waves under boundary phase angle conditions in the respective periods X1, Y1, X2, and Y2 are set to an upper limit value or a lower limit value and a carrier wave that is not discontinuous is output, it is possible to improve control accuracy for a voltage through avoidance of an output of a short voltage pulse that cannot be output in a real inverter circuit. It is made possible to maintain controllability while suppressing a switching loss of the inverter circuit.

If, on the basis of the alternating-current voltage output amplitude command or the modulation rate command, the operation by the asynchronous PWM, which is the related art, is selected under an operation condition in which overmodulation operation is made unnecessary and the overmodulation mode is selected to perform operation under an operation condition in which the overmodulation operation is suitable, it is made possible to perform operation while suppressing a harmonic loss of a load under each of the operation conditions.

After it is determined that the modulation rate is 95 to 97% or more, if a so-called three-dash pulse mode is selected to perform operation, it is possible to prevent a situation in which the pulse width is made extremely small and the inverter circuit falls into control exceeding control resolution of the inverter circuit. Further, it is possible to transition the modulation mode to the three-dash pulse mode capable of suppressing a switching loss without excessively changing a voltage distortion ratio.

If a carrier-wave-for-asynchronous-PWM-mode generating unit and a carrier-wave-for-overmodulation-mode generating unit are provided in the carrier-wave generating unit, a modulated-wave-for-asynchronous-PWM-mode generating unit and a modulated-wave-for-overmodulation-PWM-mode generating unit are provided in the modulated-wave generating unit, and the individual components are appropriately switched and used according to a modulation mode signal, it is possible to perform smooth mode transition.

Second Embodiment

The first embodiment is the embodiment in which, in the relations among the selection ranges of the modulation modes shown in FIG. 2, the lower limit value PMF_1 in the modulation rate range in which the overmodulation PWM mode in the region (2) is selected is set to 0.9069 and, in the range of the modulation rate lower than this value, the asynchronous PWM mode in the region (1) is selected. On the other hand, a second embodiment is an embodiment in which, in a region where the modulation rate PMF is PMF_1 or less as in a region (2)a shown in FIG. 9, a region where the modulation rate PMF satisfies PMF_0<PMF≤PMF_1 is defined as a "overmodulation preparation mode", the modulation-mode selecting unit 9 discriminates a modulation mode corresponding to the modulation rate condition and outputs an overmodulation preparation mode signal in the region (2)a to the carrier-wave generating unit 5 and the modulated-wave generating unit 6 as a modulation mode signal. The overmodulation preparation mode in the region (2)a, the overmodulation PWM mode in the region (2), and the three-dash pulse mode in the region (3) in this embodiment are based on a so-called synchronous PWM system for generating a gate signal synchronizing with the output voltage phase angle command value θ*.

In the second embodiment, the carrier-wave-for-overmodulation-PWM generating unit 50b and the modulated-wave-for-overmodulation-PWM generating unit 60b respectively execute kinds of processing explained below. Note that, as an example of a carrier wave and a modulated wave respectively output by the carrier-wave-for-overmodulation-PWM generating unit 50b and the modulated-wave-for-overmodulation-PWM generating unit 60b during the overmodulation preparation mode, waveforms of the carrier wave and the modulated wave at the modulation rate of 0.8 are shown in FIG. 10A and waveforms of gate signals at the modulation rate of 0.8 are shown in FIG. 10B.

Note that, when it is necessary to distinguish the carrier wave generated during the overmodulation preparation mode in the region (2)a and the carrier wave generated during the overmodulation PWM mode in the region (2), for convenience, the former is referred to as first carrier wave and the latter is referred to as second carrier wave. Similarly, when it is necessary to distinguish the modulated wave generated during the overmodulation preparation mode in the region (2)a and the modulated wave generated during the overmodulation PWM mode in the region (2), the former is referred to as first modulated wave and the latter is referred to as second modulated wave.

Figure 10A:
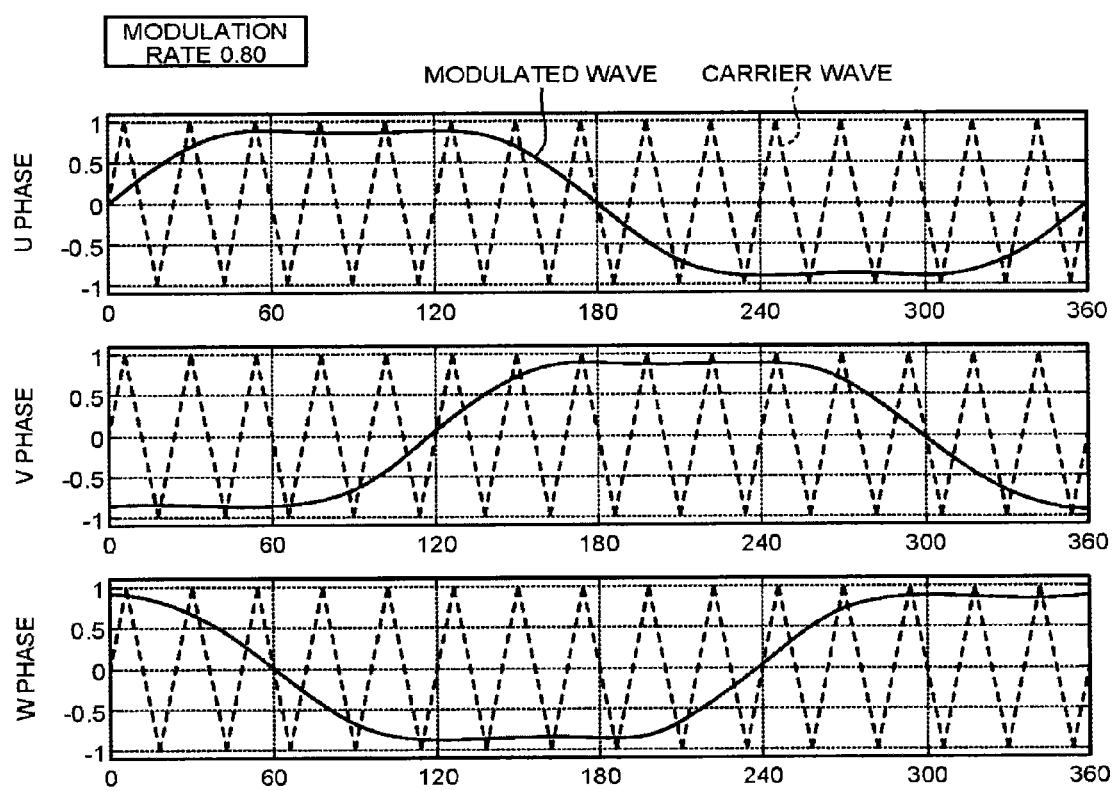
FIG. 10A is a diagram showing waveforms of a modulated wave and a carrier wave in an overmodulation preparation mode (the modulation rate is 0.8).
Figure 10B:
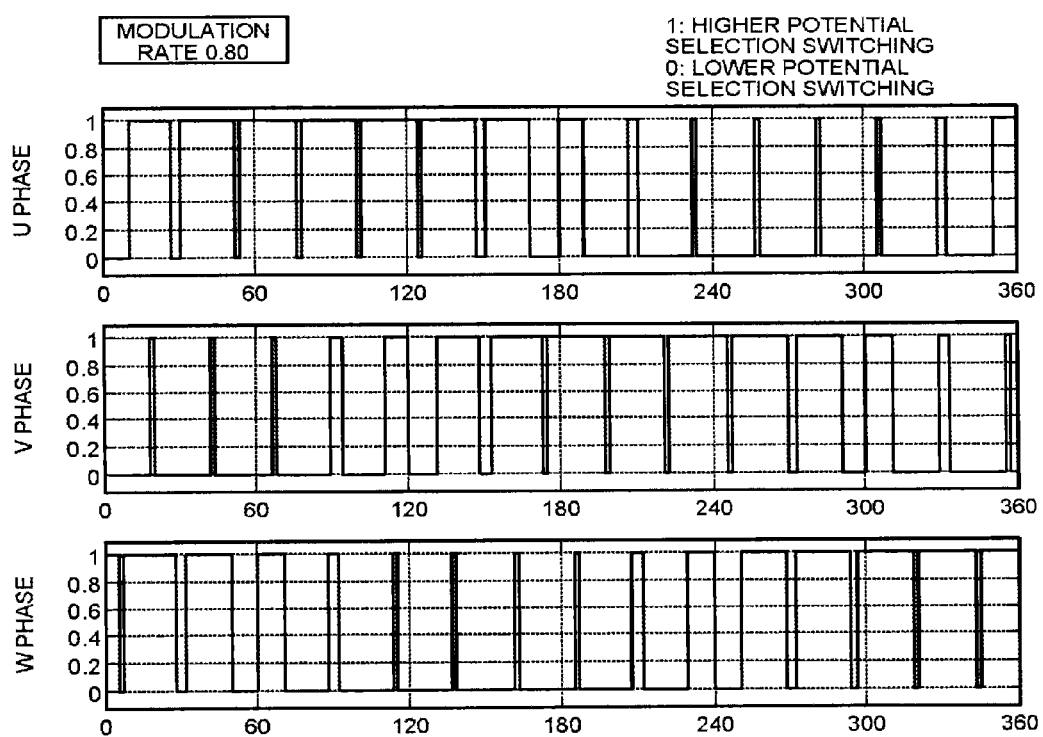
FIG. 10B is a diagram showing waveforms of gate signals in the overmodulation preparation mode (the modulation rate is 0.8).

The carrier-wave-for-overmodulation-PWM generating unit 50b calculates and outputs the carrier wave of a triangular wave shown in FIG. 10A. Note that this waveform is the same as the waveform shown in FIG. 5A. That is, the carrier-wave-for-overmodulation-PWM generating unit 50b calculates and outputs a synchronous carrier wave that synchronizes with the output voltage phase angle command value θ* and also changes to 0 at a zero-cross point of the modulated wave. Note that a state at this point is equivalent to the state in which Δx is always set to 0 explained in the first embodiment.

As in the asynchronous PWM mode in the region (1), the modulated-wave-for-overmodulation-PWM generating unit 60b calculates, on the basis of Formula (1.3), modulated waves in three phases subjected to amplitude operation corresponding to the modulation rate PMF as in the case of the asynchronous PWM mode in the region (1) and outputs the modulated waves.

That is, in both of the overmodulation preparation mode in the region (2)a and the overmodulation mode in the region (2), both of the carrier wave and the modulated wave generated by the carrier-wave-for-overmodulation-PWM generating unit 50b and the modulated-wave-for-overmodulation-PWM generating unit 60b when PMF=PMF_1 can be set to the waveforms shown in FIG. 5A. It is possible to perform smooth transition between the modes.

In general, to switch and transition the modulation mode from the asynchronous PWM mode in the region (1) to the synchronous PWM mode for performing the switching synchronizing with the output voltage phase angle command θ*, it is sometimes necessary to consider not to cause unnecessary switching operation taking into account not only the modulation rate condition but also the condition of θ*. That is, it is suitable for stable mode switching to give a certain latitude to a true switching point PMF_0 shown in FIG. 9.

Therefore, in the second embodiment, when the modulation mode is transitioned from the asynchronous PWM mode in the region (1) to the synchronous PWM mode, control for transitioning the modulation mode to the overmodulation preparation mode in the region (2)a is once performed taking into account the synchronization condition of θ* under a modulation rate condition (near PMF_0) given with a certain latitude in a region lower than the modulation rate condition PMF_1 for transitioning the modulation mode to the overmodulation PWM mode in the region (2).

In this way, in the power converter in the second embodiment, in the transition from the asynchronous PWM mode to the overmodulation PWM mode (and the opposite transition), the modulation mode is transitioned through the overmodulation preparation mode. Therefore, it is possible to perform smooth transition of the modulation mode while suppressing unintended generation of a gate signal, waveform distortion of a final output voltage of the inverter circuit, and the like.

Third Embodiment

In the first and second embodiments, the method based on Formula (1.3) is explained as a method of calculating the modulated wave in the modulated-wave generating unit 6. However, the same configuration is also possible in the method based on the modulated wave indicated by Formula (1.2). In this case, it needs to be noted that the modulation rate upper limit that can be output in the normal triangular wave carrier comparison, that is, the lower limit value PMF_1 of the modulation rate range that should be covered by the overmodulation PWM mode in the region (2) is a value smaller than the value in the first and second embodiments (see Table 4 below).

TABLE 4

Modulated wave calculation formation and overmodulation PWM mode switching modulation ratio PMF_1

| Modulated wave calculation formula | Overmodulation PWM mode switching modulation rate PMF_1 (when PMF during 180 deg energization one pulse is set to 1) |
|---|---|
| (Formula 1.2) | π/4 (=0.7854 . . . ) |
| (Formula 1.3) | π/(2√3) (=0.9069 . . . ) |

A signal calculated by the modulated-wave-for-overmodulation-PWM generating unit 60b at this point is as shown in Table 5 below.

TABLE 5

Calculated signals (U phase) of the modulated-wave-for-overmodulation-PWM generating unit 60b based on Formula (1.2)

| Period | Signal to be calculated |
|---|---|
| Y2 | The modulated wave (αu of Formula 1.2) set as PMF = PMF_1 = π/4 is reduced by (90 − Δx) [deg]/90[deg] centering on 0 [deg]<br><br>$\alpha u\_y2(\theta^*, \Delta x) = \sin\left(\frac{\pi/2}{\pi/2 - \Delta x} \cdot \theta^*\right)$ |
| X1 | If combined with the carrier wave in Table 2, any value equal to or larger than −1 is acceptable. If the value is set to "1", continuity of the modulated wave to the periods Y2 and Y1 can be given |
| Y1 | The modulated wave (αu of Formula 1.3) set as PMF = PMF_1 = π/4 is reduced by (90 − Δx) [deg]/90[deg] centering on 180 [deg] Making use of symmetry,<br><br>$\alpha u\_y1(\theta^*, \Delta x) = -\alpha u\_y2(\theta^* - \pi, \Delta x) = -\sin\left(\frac{\pi/2}{\pi/2 - \Delta x} \cdot (\theta^* - \pi)\right)$ |
| X2 | If combined with the carrier wave in Table 2, any value equal to or smaller than 1 is acceptable. If the value is set to "−1", continuity of the modulated wave to the periods Y2 and Y1 can be given |

Note that, in Table 5 above, only the calculated signals of the U phase are shown. However, concerning modulated waves for the V phase and the W phase, waveforms obtained by shifting the modulated wave of the U phase respectively by 120 [deg] and 240 [deg] with reference to θ* are calculated signals of the V phase and the W phase.

Concerning Δx, the carrier wave and the modulated wave can be calculated by sequentially substituting the modulation rate PMF in a function or can be calculated by converting functions into map data in advance, referring to the map data according to the modulation rate PMF, and substituting a reference value in the formulas of Table 5 and the form of the carrier wave in Table 2.

As explained above, according to the power converter in the third embodiment, there is an effect that it is made possible to perform theoretical implementation in a control device with a modulated wave calculation simpler than the formulas of Table 2 as shown in Table 5.

Fourth Embodiment

As a PWM technology for a three-phase alternating-current load, there is a technology called two-phase modulation mainly for the purpose of reducing a loss of an inverter circuit. Like the third harmonic superimposition described in Formula (1.3), this is a technology for providing, even if a voltage signal common to the three phases is superimposed on phase voltages, a period in which switching is alternately stopped in each of the phases making use of a characteristic of a three-phase alternating-current voltage in which a line voltage is invariable.

As a control method according to the fourth embodiment, a form in which the overmodulation PWM mode and the overmodulation preparation mode in the second embodiment are configured on the basis of the two-phase modulation is explained below as an example.

First, when the overmodulation preparation mode in the region (2)$a$ is selected, the modulated-wave-for-overmodulation-PWM generating unit 60$b$ calculates the modulated waves αu, αv, and αw using the following formula.

$$\begin{pmatrix} \alpha u \\ \alpha v \\ \alpha w \end{pmatrix} = \frac{4}{\pi} \cdot PMF \cdot \begin{pmatrix} \alpha u\_n + \alpha 2ph \\ \alpha v\_n + \alpha 2ph \\ \alpha w\_n + \alpha 2ph \end{pmatrix} \quad (1.5a)$$

Note that αu_n, αv_n, and αw_n in the above formula are calculated using the following formula. For α2ph, a calculation formula is selected according to Table 6 below.

$$\begin{pmatrix} \alpha u\_n \\ \alpha v\_n \\ \alpha w\_n \end{pmatrix} = \frac{4}{\pi} \cdot PMF \cdot \begin{pmatrix} \sin\theta* \\ \sin\left(\theta* - \frac{2}{3}\pi\right) \\ \sin\left(\theta* + \frac{2}{3}\pi\right) \end{pmatrix} \quad (1.5b)$$

TABLE 6

Selection formula for α2ph

| | Voltage phase angle command θ* | α2ph |
| --- | --- | --- |
| Period 1 | (0° < θ* ≤ 60°) | −1 − αv_n |
| Period 2 | (60° < θ* ≤ 120°) | +1 − αu_n |
| Period 3 | (120° < θ* ≤ 180°) | −1 − αw_n |
| Period 4 | (180° < θ* ≤ 240°) | +1 − αv_n |
| Period 5 | (240° < θ* ≤ 300°) | −1 − αu_n |
| Period 6 | (300° < θ* ≤ 360°) | +1 − αw_n |

Figure 11A:
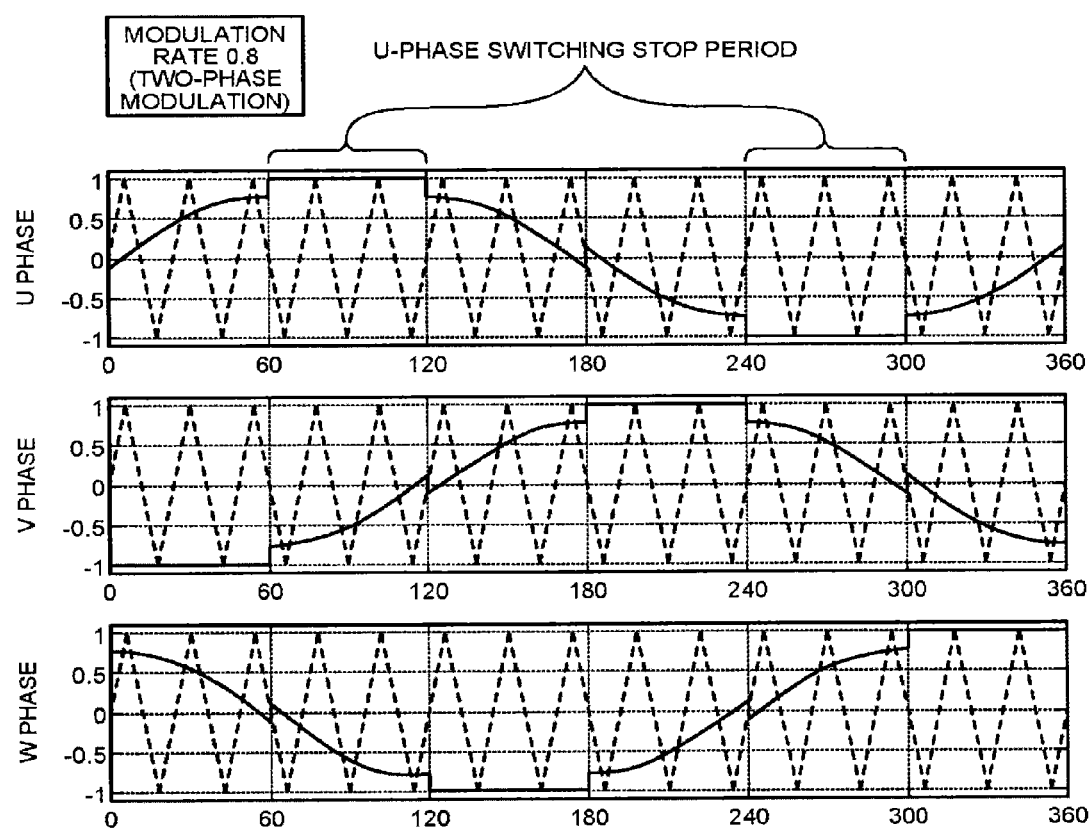
FIG. 11A is a diagram of waveforms of a modulated wave and a carrier wave in the overmodulation preparation mode (the modulation rate is 0.8) during two-phase modulation execution.
Figure 11B:
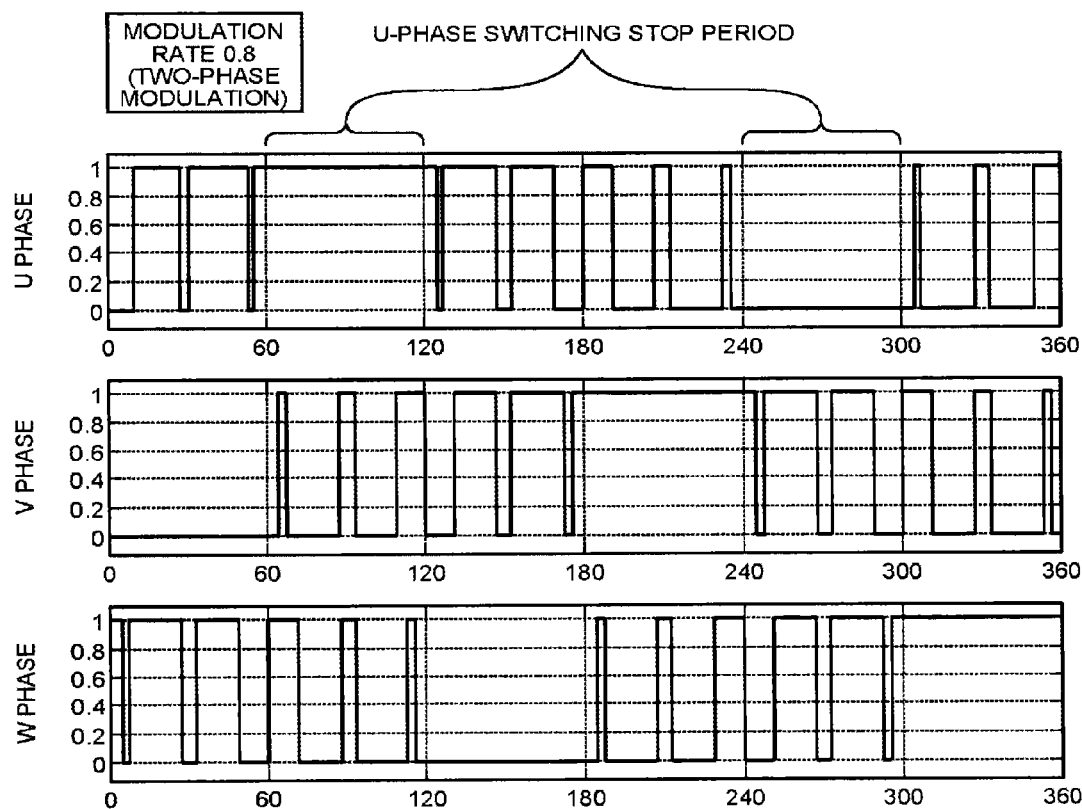
FIG. 11B is a diagram showing waveforms of gate signals in the overmodulation preparation mode (the modulation rate is 0.8) during the two-phase modulation execution.

Waveforms of modulated waves for which the control method according to the fourth embodiment is used are shown in FIG. 11A. Note that, in FIG. 11A, waveforms of carrier waves synchronizing with the output voltage phase angle command value θ* are also shown. By selecting a three-phase common signal α2ph as shown in Table 6, as shown in FIG. 11A, a section where the modulated waves are always "1" in the phases and a section where the modulated waves are always "−1" are provided. Therefore, as a comparison result with the carrier waves by the comparing unit 7, as shown in FIG. 11B, those sections are sections where switching is stopped.

Figure 12A:
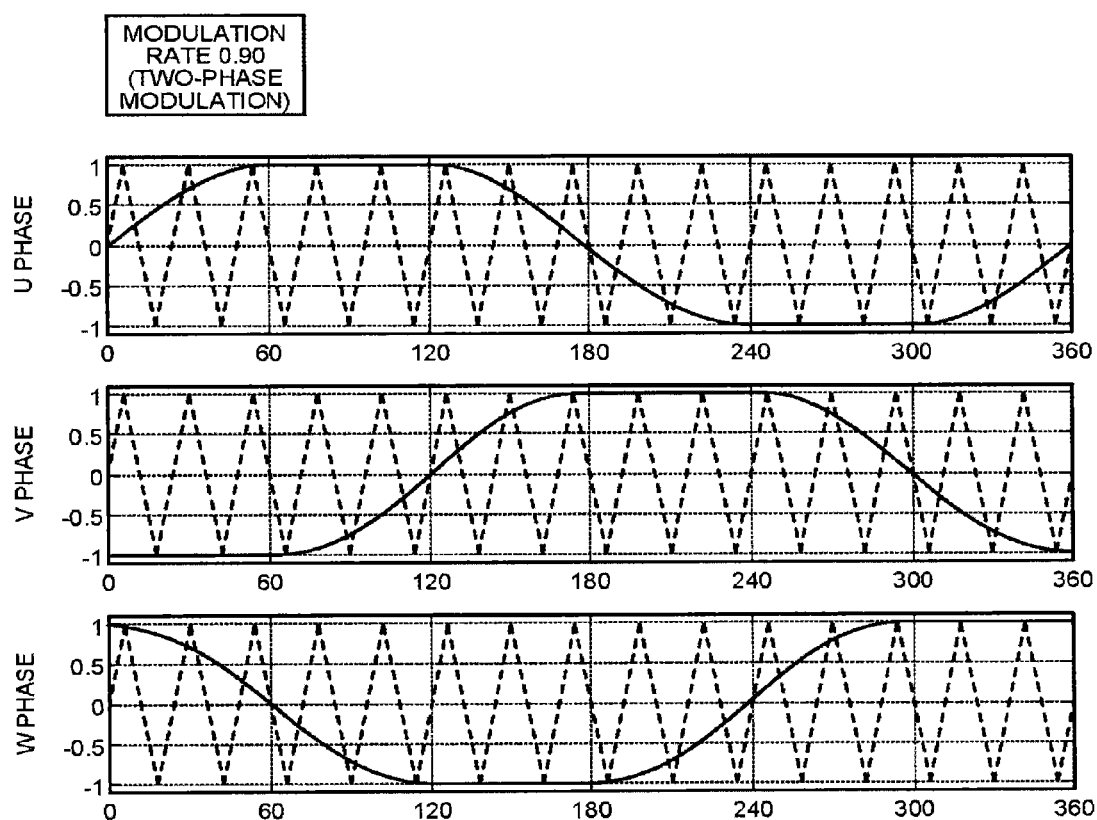
FIG. 12A is a diagram showing a modulated wave and a carrier wave in the overmodulation preparation mode (the modulation rate is 0.9) during the two-phase modulation execution.
Figure 12B:
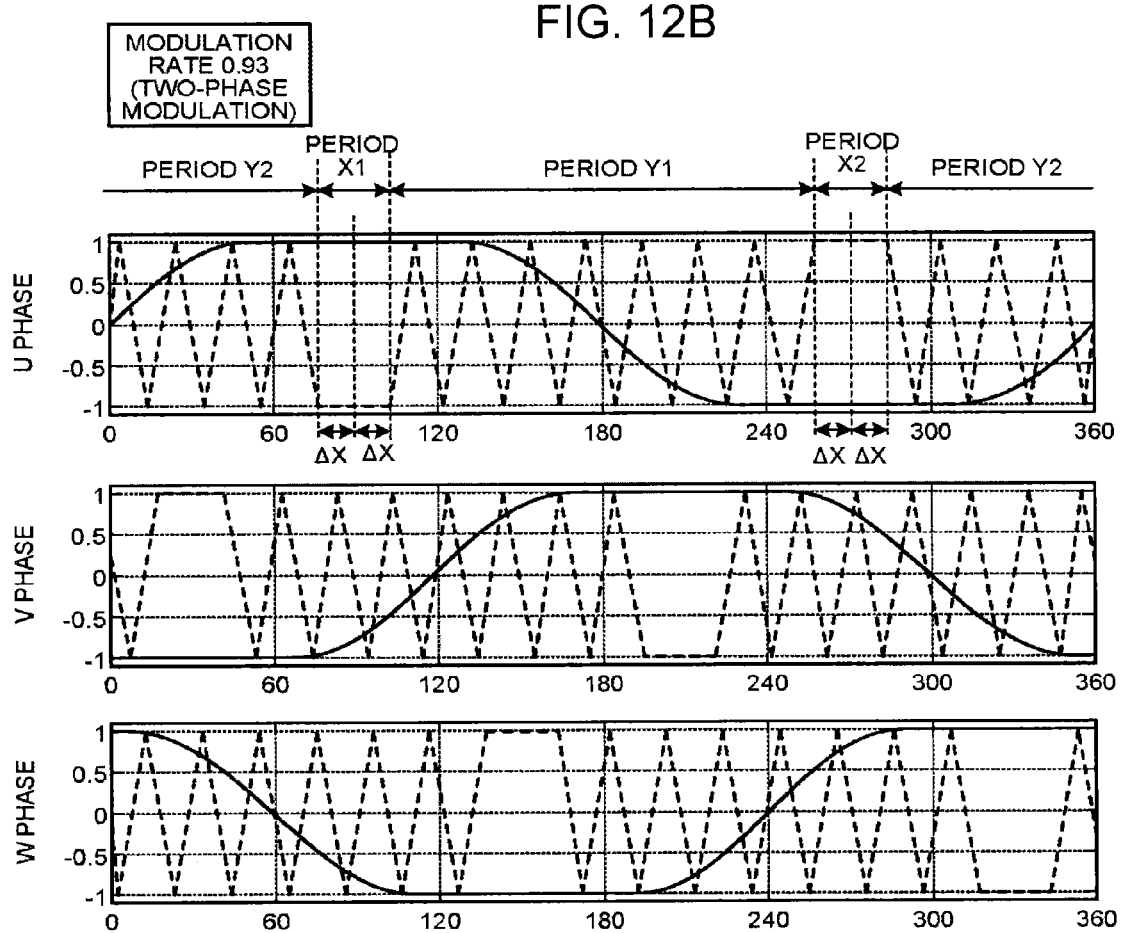
FIG. 12B is a diagram showing waveforms of a modulated wave and a carrier wave in the overmodulation preparation mode (the modulation rate is 0.93) during the two-phase modulation execution.

Like the third harmonic superimposition indicated by Formula (1.3), the two-phase modulation is a method that can further improve a modulation rate upper limit than the general modulation by the modulated wave indicated by Formula (1.2). As in the first embodiment, a transition point to the overmodulation PWM mode is PMF_1=π/(2√3). A method of generating an output signal in the modulated-wave-for-overmodulation-PWM generating unit 60$b$ when the overmodulation PWM mode in the region (2) is selected on the basis of the modulation rate condition is shown in Table 7 below. Examples of the output signal are shown in FIG. 12A to FIG. 12C.

TABLE 7

Calculated signals (U phase) of the modulated-wave-for-overmodulation-PWM generating unit 60b based on the two-phase modulation

| Period | Signal to be calculated |
| --- | --- |
| Y2 | αu based on (Formula 1.5a), (Formula 1.5b), and Table 6 PMF = PMF_1π/(2√3) is reduced by (90 − Δx) [deg]/90[deg] centering on 0 [deg] |
| X1 | If combined with the carrier wave in Table 2, any value equal to or larger than −1 is acceptable. If the value is set to "1", continuity of the modulated wave to the periods Y2 and Y1 can be given |
| Y1 | αu based on (Formula 1.5a), (Formula 1.5b), and Table 6 PMF = PMF_1π/(2√3) is reduced by (90 − Δx) [deg]/90[deg] centering on 180 [deg] |
| X2 | If combined with the carrier wave in Table 2, any value equal to or smaller than 1 is acceptable. If the value is set to "−1", continuity of the modulated wave to the periods Y2 and Y1 can be given |

Note that, in Table 7 above, only the calculated signals of the U phase are shown. However, concerning carriers waves for the V phase and the W phase, waveforms obtained by shifting the carrier wave of the U phase respectively by 120 [deg] and 240 [deg] with reference to θ* are calculated signals of the V phase and the W phase.

Concerning Δx, the carrier wave and the modulated wave can be calculated by sequentially substituting the modulation rate PMF in a function or can be calculated by converting functions into map data in advance, referring to the map data according to the modulation rate PMF, and substituting a reference value in the formulas of Table 7.

As explained above, in the power converter in the fourth embodiment, switching stop periods are defined as the periods X1 and X2 in this application on the basis of the two-phase modulation originally having a switching stop period, and operation corresponding to the modulation rate PMF is performed. Therefore, it is made possible to perform the overmodulation exceeding the modulation rate upper limit value "π/(2√3)", which the original two-phase modulation enables, while reducing a switching loss of the inverter circuit 2. Further, it is possible to perform a smooth shift to the modulation rate 1.

Fifth Embodiment

In the first to fourth embodiments, in all the PWM modes, the carrier-wave generating unit 5 and the modulated-wave generating unit 6 are provided and the carrier wave and the modulated wave are compared to obtain the gate signal. However, a PWM modulation method not depending on the comparison of the carrier wave and the modulated wave is also widely known. In particular, the overmodulation preparation mode in the region (2)*a*, the overmodulation PWM mode in the region (2), and the three-dash pulse mode in the region (3) in this application are based on a so-called synchronous PWM system for generating the gate signal synchronizing with the output voltage phase angle command value θ*. A relation between phase angles that should be switched in the phases and the output voltage phase angle command value θ* can be uniquely determined by the modulation rate PMF and can be mapped in advance.

As a more specific example of the mapping, if phase angles at which switching occurs when the modulation rate PMF is changed from 0 to 1 are recorded and mapped by simulation work in advance in the carrier-wave-for-overmodulation-PWM generating unit 50*b*, the modulated-wave-for-overmodulation-PWM generating unit 60*b*, and the comparing unit 7, it is possible to calculate a switching occurrence phase angle by using the modulation rate PMF as an argument.

Figure 13:
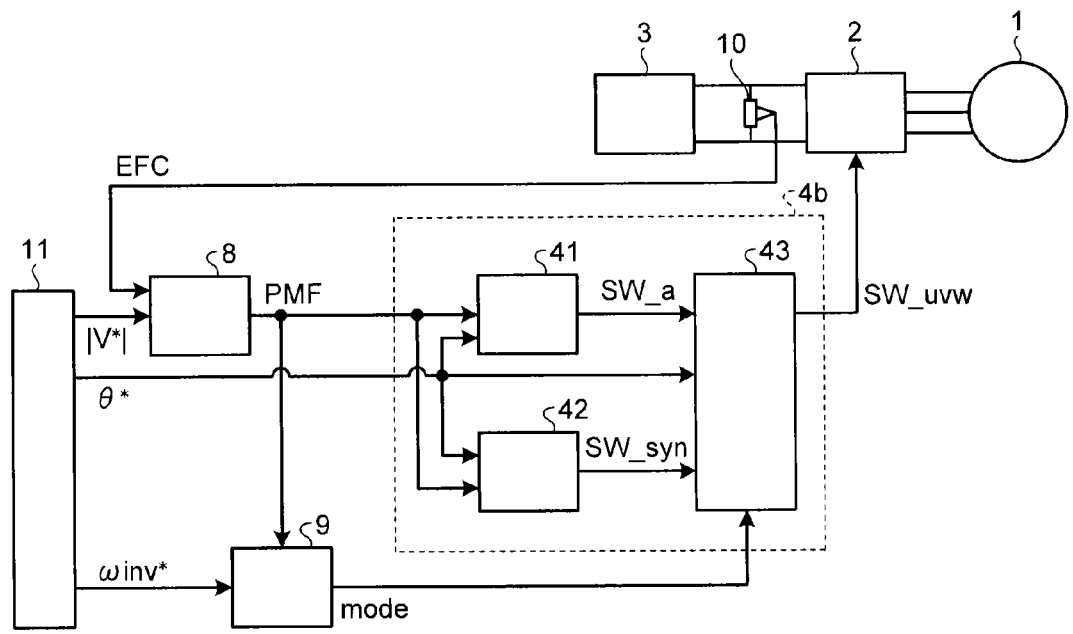
FIG. 13 is a block diagram showing the configuration of a power converter in a fifth embodiment.

As a more specific embodiment, a configuration not depending on the comparison of the carrier wave and the modulated wave is shown in FIG. 13. When the configuration shown in FIG. 13 is compared with the configuration in the first embodiment shown in FIG. 1, the configuration of a switching-signal generating unit 4*b* is different. However, a switching command SW_uvw to be finally generated is the same as the switching commands explained above in the embodiment.

The switching-signal generating unit 4*b* includes an asynchronous-PWM-switching-signal generating unit 41, a synchronous-PWM-switching-signal generating unit 42, and a switching-signal selecting unit 43 that selects, according to the modulation mode, gate signals output by the asynchronous-PWM-switching-signal generating unit 41 and the synchronous-PWM-switching-signal generating unit 42. The asynchronous-PWM-switching-signal generating unit 41 can use a method like the "instantaneous space magnetic flux interlinkage vector circular locus PWM" described in page 47 of Non Patent Literature 1 described above. Alternatively, as in the other embodiments, the asynchronous-PWM-switching-signal generating unit 41 can use a method of comparing the carrier wave and the modulated wave for asynchronous PWM.

Figure 14:
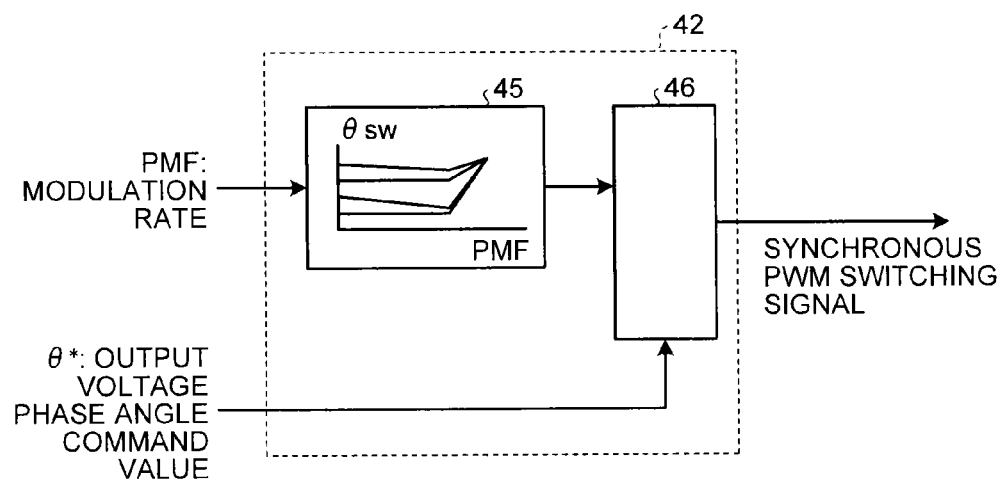
FIG. 14 is a block diagram showing the configuration of a synchronous-PWM-switching-signal generating unit in the fifth embodiment.

On the other hand, the synchronous-PWM-switching-signal generating unit 42 can be configured, for example, as shown in FIG. 14. As shown in FIG. 14, the synchronous-PWM-switching-signal generating unit 42 includes a switching characteristic map 45 in which the relation between the modulation rates and the switching occurrence phase angles, which can be calculated in advance, illustrated above is mapped, and a switching-output determining unit 46 that compares switching phase angles of the U, V, and W phases output by the switching characteristic map 45 and the output voltage phase angle command value θ* so as to output a synchronous PWM switching signal.

With the configuration explained above, by referring to the switching characteristic map from the modulation rate PMF without always calculating the modulated wave and the carrier wave, it is made possible to output gate signals in the overmodulation preparation mode, the overmodulation PWM mode, and the three-dash pulse mode, and there is an effect that it is made possible to reduce computational complexity in a control device and perform a PWM calculation without using an expensive high-speed arithmetic processing operation unit.

Sixth Embodiment

In the power converter in the fifth embodiment, the gate signal is generated using the switching characteristic map. Therefore, in so-called synchronous PWM, it is possible to select all modulation methods. For example, as the switching characteristic map for the overmodulation preparation mode in the region (2)*a*, it is possible to use so-called low-order harmonic removal PWM (for detailed contents, see Patent Literature 5 described above) for performing for control for suppressing or removing a harmonic of a specific order from a PWM output voltage of the inverter circuit 2. This form is explained as a sixth embodiment.

When the low-order harmonic removal PWM is used, a harmonic voltage of a specific order can be removed from a voltage applied to the alternating-current electric motor 1 to which electric power is supplied from the inverter circuit 2. Therefore, there is an effect that a part of a harmonic current and a harmonic loss are suppressed and a torque ripple and noise of a specific order can be reduced. However, because the effect is obtained by contriving operation of pulse generation timing, an upper limit of a modulation rate with which the effect can be maintained is determined.

Figure 15:
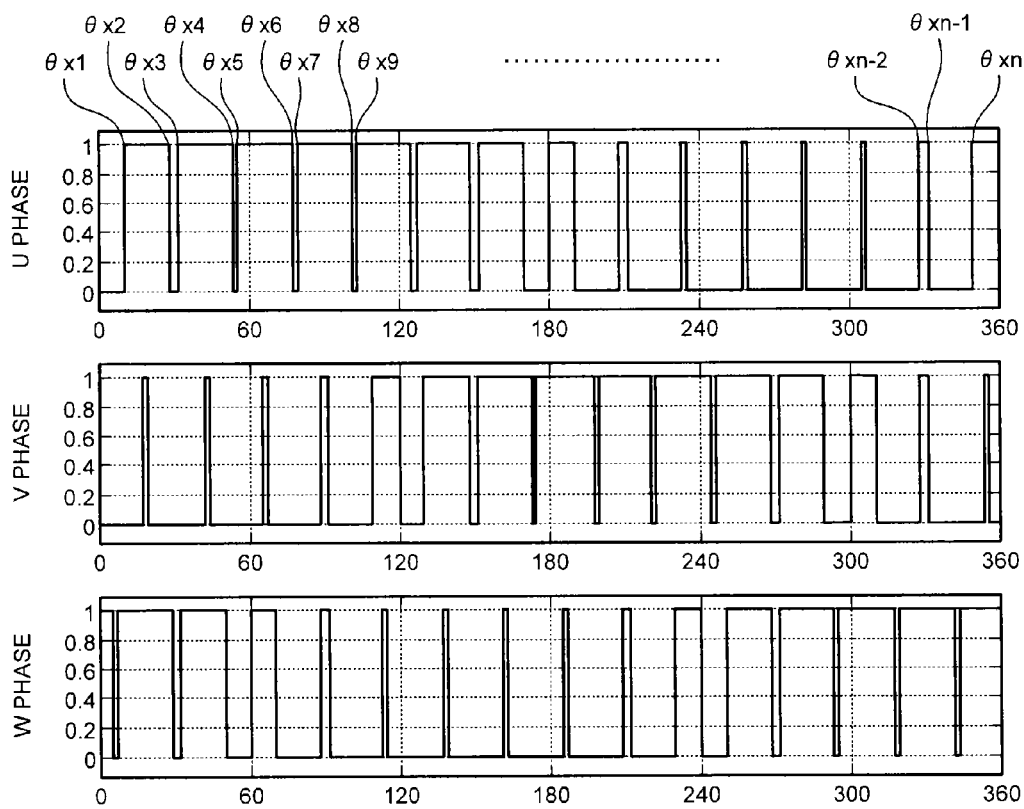
FIG. 15 is a diagram showing an example of a switching phase angle $θx$ at a low-order harmonic removal PWM maximum modulation rate in the fifth embodiment.

A modulation rate upper limit value in the low-order harmonic removal PWM is represented as PWM_x and a sequence of switching occurrence phase angles at the modulation rate upper limit value is represented as θx=(θx1, θx2, θx3, . . . , θxn). A switching waveform in this case is, for example, as shown in FIG. 15.

Based on these kinds of information, it is possible to create the switching characteristic map for the overmodulation PWM.

Specifically, the periods X1, Y1, X2, and Y2 same as the periods in FIG. 6B and FIG. 7B, which are switching characteristic maps for the overmodulation PWM and PMF>PMF_x or more, are defined with reference to the voltage phase angle command value θ* of 0, 90, 180, and 270 [deg] (in the case of the U phase) using θx.

Δx for causing the periods X1 and X2 is defined as follows:

$\Delta x=0$ at $PMF=PMF\_x$ $\Delta x=90$ deg at $PMF=1$(one-pulse mode)

At PMF_x<PMF<1, according to the PMF, Δx is operated to be larger as the PMF is larger.

Figure 16:
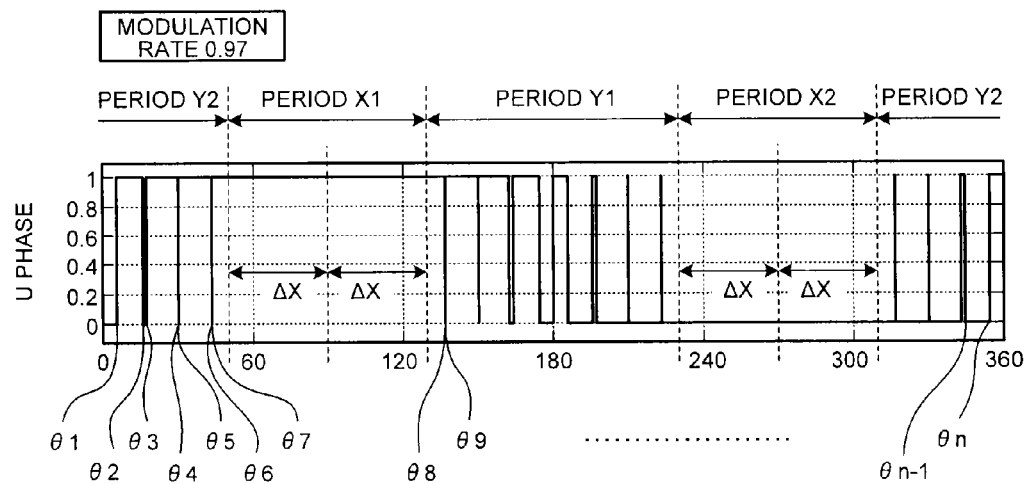
FIG. 16 is a diagram showing an example of a switching phase angle $θ$ in the overmodulation PWM mode (the modulation rate is 0.97) in the fifth embodiment.

From the switching occurrence phase angle sequence θx and Δx, as shown in FIG. 16, a switching characteristic θ(Δx)=(θ1, θ2, θ3, . . . , θn) in the overmodulation PWM mode is calculated. In the cycles Y2 and Y1, a switching characteristic obtained by reducing θx=(θx1, θx2, θx3, . . . , θxn) in the abscissa direction by (90−Δx)/90 centering on 0 [deg] and 180 [deg] is represented as θ(Δx)= (θ1, θ2, θ3, . . . , θn).

Consequently, although the function of the low-order harmonic removal is lost, it is made possible to perform continuous modulation to the vicinity of the modulation rate 1 (the one-pulse mode). For example, at the modulation rate of 0.97 or more, when the modulation mode is switched to the three-dash pulse mode (switching phase angles can be mapped in the same manner), it is made possible to more smoothly perform the switching of the modulation rate 1, as in the case of the first embodiment.

Seventh Embodiment

In the first to sixth embodiments, the inverter circuit 2 is the two-level inverter. However, when the inverter circuit 2 is a so-called multilevel, the same function can be configured.

For example, in the second embodiment, when the inverter circuit 2 is a three-level inverter, the carrier-wave generating unit is for the three-level. Two kinds of carrier waves, i.e., a carrier wave for an upper element and a carrier wave for a lower element are output from the carrier-wave generating unit 5. A gate signal is calculated through comparison with the modulated wave. Note that the gate signal takes any one of three levels; higher potential "+1", intermediate potential "0", and lower potential "−1" with respect to a direct-current input voltage.

Figure 9:
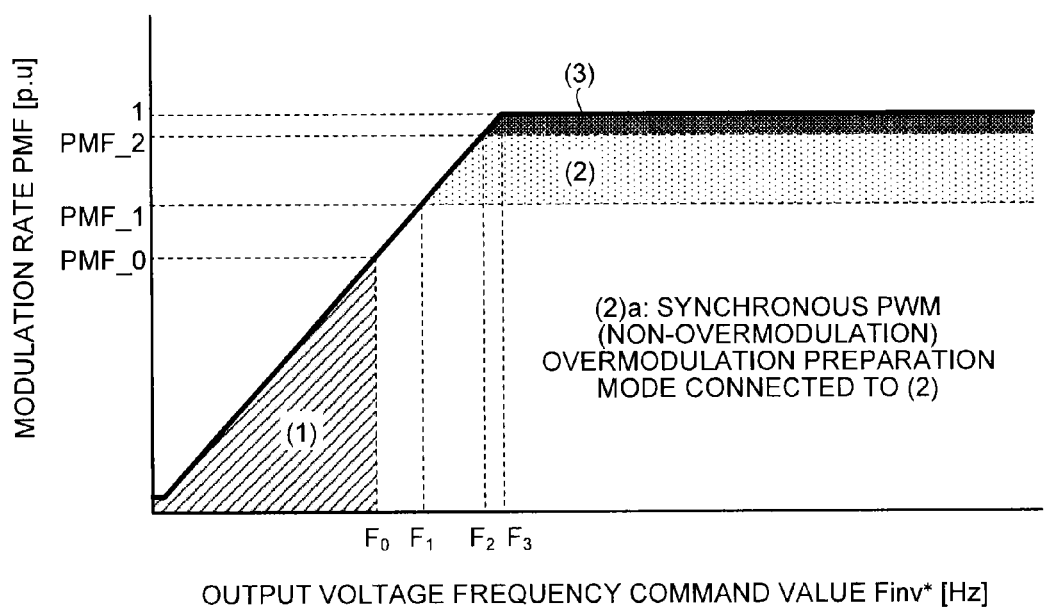
FIG. 9 is a diagram showing a mode selection method in a second embodiment of the modulated-wave selecting unit.

A power converter in a seventh embodiment including such a three-level inverter operates with four modes corresponding to the four regions defined in FIG. 9, specifically, a three-level asynchronous PWM mode (the region (1)), a three-level overmodulation preparation mode (the region (2)a), a three-level overmodulation PWM mode (the region (2)), and a one-dash pulse mode (the region (3)).

<Three-Level Asynchronous PWM Mode>

The carrier-wave-for-asynchronous-PWM generating unit 50a in the carrier-wave generating unit 5 outputs the carrier wave for the upper element and the carrier wave for lower element asynchronous with the voltage phase angle command value θ*.

<Three-Level Overmodulation Preparation Mode>

The carrier-wave-for-overmodulation-PWM generating unit 50b in the carrier-wave generating unit 5 outputs the carrier wave for the upper element and the carrier wave for lower element synchronizing with the voltage phase angle command value θ*.

<Three-Level Overmodulation PWM Mode>

The carrier-wave-for-overmodulation-PWM generating unit 50b defines the periods Y2, X1, Y1, and X2 (in the case of the U phase) respectively centering on 0, 90, 180, and 270 [deg] as shown in FIG. 16 and outputs the carrier wave for the upper element and the carrier wave for the lower element in which Δx corresponding to the modulation rate is manipulated.

Note that, in the three modes explained above, the behaviors of the modulated-wave-for-asynchronous-PWM generating unit 60a and the modulated-wave-for-overmodulation-PWM generating unit 60b are the same as the behaviors in the second embodiment.

<One-Dash Pulse Mode>

As in the three-dash pulse mode explained in the first embodiment, it is impossible to generate a pulse of a short time at random because of the limitation of the inverter circuit 2. Therefore, in this mode, the number of switchings in the periods Y1 and Y2 is minimized in a region in the vicinity of the modulation rate of 1 (e.g., a region where the modulation rate exceeds 0.95 to 0.97). In the case of the three-level inverter, for example, if the technology disclosed in Patent Literature 6 is used, it is possible to output one pulse having a variable pulse width. If this is used instead of the three-dash pulse mode in the case of the two-level inverter, it is possible to perform smooth transition from the three-level overmodulation mode in the region (2).

As explained above, with the power converter in the seventh embodiment, even in overmodulation control in a multilevel inverter, it is possible to improve "following performance" to a change in an alternating-current voltage amplitude command.

The configuration and the operation of the power converters according to the first to seventh embodiments are explained above. According to the concepts of these embodiments, it is made possible to configure a power converter including, as a gist, content explained below.

First, it is possible to configure a power converter that operates to fix, as gate signals to the phases, in one cycle of alternating-current voltage output commands of each of the phases, a gate signal to always output a direct-current input positive side terminal voltage value of the inverter circuit 2 in a first period (X1) centering on a first phase angle (θ1) for higher potential, fix a gate signal to always output a direct-current input negative side terminal voltage value of the inverter circuit 2 in a second period (X2) centering on a second phase angle (θ2: θ2>θ1) for lower potential, generate a gate signal in which a first ratio by a third period (Y1), which is obtained by excluding the first and second periods (X1 and X2) from a period between the first phase angle (θ1) and the second phase angle (θ2), and the first period (X1) and a second ratio by a fourth period (Y2), which is obtained by excluding the first and second periods (X1 and X2) from a period between the second phase angle (θ2) and a phase angle (θ1+360) obtained by shifting the first phase angle (θ1) 360 degrees in a positive direction, and the second period X2 are set on the basis of a modulation rate command or an alternating-current voltage output amplitude command value, and maintain, as a phase angle command condition of a gate signal in the third and fourth periods (Y1 and Y2), in the third period (Y1), a ratio of a phase angle for turning on and off the gate signal and an average ((θ1+θ2)/2) of the first and second phase angles (θ1 and θ2) and maintain, in the fourth period (Y2), a ratio of a phase angle for turning on and off the gate signal and a phase angle ((θ1+θ2)/2+180) obtained by shifting a phase angle of an average 180 degrees. With the power converter configured as explained above, in so-called overmodulation control for improving a modulation degree, which is a ratio of an output alternating-current voltage amplitude of the inverter circuit to a direct-current input voltage, it is possible to obtain an effect that following performance to a change in the alternating-current voltage output amplitude command is improved.

Note that the power converter can include a modulation-rate calculating unit that divides the alternating-current voltage output amplitude command value by the input direct-current voltage to calculate a modulation rate command and outputs the modulation rate command. A switching-signal generating unit can output a gate signal in which the ratios of the periods X1 and X2 and the periods Y1 and Y2 in one cycle of the alternating-current voltage command is set on the basis of the modulation rate command.

With the power converter according to this embodiment, it is possible to configure the power converter to operate to fix, in the first period (X1), the magnitude of a modulated wave output from the modulated-wave generating unit to an upper limit value or more of a carrier wave output from the carrier-wave generating unit, fix, in the second period (X2), the magnitude of the modulated wave output from the modulated-wave generating unit to a lower limit value or less of the carrier wave output from the carrier-wave generating unit, and output, in the third and fourth periods (Y1 and Y2), a gate signal set by reducing or expanding, on the basis of the alternating-current voltage output amplitude command or the modulation rate command, in a phase angle direction, at a same ratio, the carrier wave output from the carrier-wave generating unit, the modulated wave having as value equal to or more than an upper limit output from the modulated-wave generating unit, and the modulated wave output from the modulated-wave generating unit. With the power converter configured as explained above, it is made possible to further improve the following performance to the change in the alternating-current voltage output amplitude command.

Note that, in the power converter according to this embodiment, a sine wave can be output as the modulated wave in the third and fourth periods (Y1 and Y2). A signal common to the three phases can be superimposed in addition to the sine wave. With the power converter configured as explained above, it is possible to improve a degree of freedom of setting of an operation range in which the overmodulation control is used.

In the power converter according to this embodiment, as the carrier wave output by the carrier-wave generating unit, the carrier-wave generating unit can set values of the carrier waves under boundary phase angle conditions in the respective first to fourth periods (X1, X2, Y1, and Y2) to an upper limit value and a lower limit value and generate and output a carrier wave that is not discontinuous. With the power converter configured in this way, it is made possible to improve control accuracy of a voltage through avoidance of an output of a short voltage pulse incapable of being output by a real inverter circuit, and thus it is made possible to maintain controllability while suppressing a switching loss of the inverter circuit.

With the power converter according to this embodiment, it is made possible to configure the power converter that operates to select an overmodulation mode during an operation condition under which the alternating-current voltage output amplitude command is present within a range of a voltage amplitude setting range set in advance, during an operation condition under which the modulation rate command is present within a range of a modulation rate setting range set in advance, or during an operation condition under which an alternating-current voltage output fundamental wave frequency is present within a range of an alternating-current voltage output fundamental wave frequency setting range set in advance and, when the overmodulation mode is selected, output a gate pulse signal obtained by setting the first to fourth periods (X1, X2, Y1, and Y2) on the basis of the alternating-current voltage output amplitude command, the modulation rate command, and the alternating-current voltage output fundamental wave frequency. With the power converter configured as explained above, the operation by the related art is performed under an operation condition in which overmodulation operation is unnecessary and the overmodulation mode is selected to perform operation under an operation condition in which the overmodulation operation is suitable. Consequently, it is made possible to perform the operation while suppressing a harmonic loss of a load under each of the operation conditions.

With the power converter according to this embodiment, it is possible to configure the power converter that operates to select, when the inverter circuit is a two-level inverter, after it is determined that the modulation rate is 95% or more, a three-dash pulse mode in which the number of switchings in the third and fourth periods (Y1 and Y2) is only three times and, when the three-dash pulse mode is selected, output a gate signal for performing, per one cycle of the alternating-current voltage output command, switching control six times in total in a boundary between the first and third periods (X1 and Y1), a boundary between the third and second periods (Y2 and X2), a boundary between the second and fourth periods (X2 and Y2), a boundary between the fourth and first periods (Y2 and X1), the center of the second period (Y1), and the center of the fourth period (Y2).

With the power converter configured as explained above, it is possible to prevent a situation in which the pulse width in the overmodulation mode is made extremely small and the inverter unit falls into control exceeding control resolution of the inverter circuit. Further, it is made possible to transition the modulation mode to the three-dash pulse mode capable of suppressing a switching loss without excessively changing a voltage distortion ratio.

When the power converter according to this embodiment is configured to be capable of selecting a synchronous PWM mode besides the overmodulation mode, it is possible to configure the power converter to operate to select the synchronous PWM mode during an operation condition under which the alternating-current voltage output amplitude command is present in a range smaller than a voltage amplitude setting threshold set in advance, during an operation condition under which the modulation rate command is present in a range smaller than a modulation rate setting threshold set in advance, or during an operation condition under which the alternating-current voltage output fundamental wave frequency is present in a range smaller than an alternating-current voltage output fundamental wave frequency setting threshold set in advance and, when the synchronous PWM mode is selected, output a gate signal that synchronizes with an alternating-current voltage output phase angle command and in which the number of switchings in one cycle of the alternating-current voltage output command is fixed. With the power converter configured as explained above, the synchronous PWM by the related art is performed in an operation region where overmodulation is unnecessary. Consequently, it is possible to obtain an effect that the power converter is adaptable to wide operation conditions necessary in practice.

When the power converter according to this embodiment is configured to be capable of selecting an asynchronous PWM mode besides the overmodulation mode, it is made possible to configure the power converter to operate to select the asynchronous PWM mode during an operation condition under which the alternating-current voltage output amplitude command is present in a range smaller than a voltage amplitude setting threshold set in advance, during an operation condition under which the modulation rate command is present in a range smaller than a modulation rate setting threshold set in advance, or during an operation condition under which the alternating-current voltage output fundamental wave frequency is present in a range smaller than an alternating-current voltage output fundamental wave frequency setting threshold set in advance and, when the asynchronous PWM mode is selected, output a gate signal in which the number of switchings in a unit time is a value set in advance. With the power converter configured as explained above, if the asynchronous PWM by the related art is performed in an operation region where overmodulation is unnecessary, it is made possible to obtain an effect that the power converter is adaptable to wide operation conditions necessary in practice, in particular, operation including a low-frequency region including a fundamental wave frequency 0.

Note that the configurations explained in the first to seventh embodiments are examples of the configuration of the present invention. It goes without saying that the configurations can be combined with publicly-known technologies other than the prior art documents and can be partially changed, for example, omitted without departing from the spirit of the present invention.

INDUSTRIAL APPLICABILITY

As explained above, the present invention is useful as a power converter that enables stable operation of a load in a wide voltage operation range while suppressing a sudden change and a pulsation of an inverter output current.

REFERENCE SIGNS LIST

1 Alternating-current electric motor
2 Inverter circuit
3 Direct-current-voltage source unit
4, 4b Switching-signal generating unit
5 Carrier-wave generating unit
6 Modulated-wave generating unit
7 Comparing unit
8 Modulation-rate calculating unit
9 Modulation-mode selecting unit
10 Voltage detecting unit
11 Alternating-current-voltage-command generating unit
41 Asynchronous-PWM-switching-signal generating unit
42 Synchronous-PWM-switching-signal generating unit
43 Switching-signal selecting unit
45 Switching characteristic map
46 Switching-output determining unit
50a Carrier-wave-for-asynchronous-PWM generating unit
50b Carrier-wave-for-overmodulation-PWM generating unit
50c Carrier-wave-for-three-dash-pulse generating unit
51 Carrier-wave selecting unit
60a Modulated-wave-for-asynchronous-PWM generating unit
60b Modulated-wave-for-overmodulation-PWM generating unit
60c Modulated-wave-for-three-dash-pulse generating unit
61 Modulated-wave selecting unit

The invention claimed is:

1. A power converter comprising:
an inverter circuit that converts a direct-current voltage into an alternating-current voltage and outputs the alternating-current voltage; and
a switching-signal generating unit that outputs a gate signal for driving the inverter circuit to the inverter circuit, wherein
when a modulation rate of the inverter circuit is equal to or smaller than a first threshold, the switching-signal generating unit outputs the gate signal in an overmodulation mode including a first period and a second period in a half cycle of the alternating-current voltage, the first period being a period in which the inverter circuit performs switching a plurality of times, the second period being a period in which the switching of the inverter circuit is stopped for a period longer than an interval between the switchings of the inverter circuit in the first period, and
when the modulation rate of the inverter circuit is larger than the first threshold, the switching-signal generating unit outputs the gate signal in a three-dash pulse mode in which the inverter circuit performs switching only three times in the first period at a switching frequency synchronizing with a frequency of the alternating-current voltage, the three-dash pulse mode having the first period and the second period in the half cycle of the alternating-current voltage.

2. The power converter according to claim 1, wherein the switching-signal generating unit calculates the gate signal on the basis of an alternating-current voltage output amplitude command value and an alternating-current voltage output phase angle command value, and fixes, when the gate signal is generated in the three-dash pulse mode or the overmodulation mode, in one cycle of an alternating-current voltage output command, the gate signal to always output a direct-current input positive side terminal voltage value of the inverter circuit in a third period (X1) centering on a first phase angle ($\theta 1$) for higher potential, fixes the gate signal to always output a direct-current input negative side terminal voltage value of the inverter circuit in a fourth period (X2) centering on a second phase angle ($\theta 2$: $\theta 2 > \theta 1$) for lower potential, generates the gate signal in which a first ratio by a fifth period (Y1), which is obtained by excluding the third period and fourth period (X1 and X2) from a period between the first phase angle ($\theta 1$) and the second phase angle ($\theta 2$), and the third period (X1) and a second ratio by a sixth period (Y2), which is obtained by excluding the third period and fourth period (X1 and X2) from a period between the second phase angle ($\theta 2$) and a phase angle ($\theta 1 + 360$) obtained by shifting the first phase angle ($\theta 1$) 360 degrees in a positive direction, and the fourth period (X2) are set on the basis of a modulation rate command or an alternating-current voltage output amplitude command value, and maintains, as a phase angle command condition for turning ON and OFF gate signals in the fifth period and the sixth period (Y1 and Y2), in the fifth period (Y1), a ratio of period widths between each of the phase angles for turning on and off the gate signal and an average (($\theta 1 + \theta 2$)/2) of the first and second phase angles ($\theta 1$ and $\theta 2$), and maintains, in the sixth period (Y2), a ratio of period widths between each of the phase angles for turning on and off the gate signal and a phase angle (($\theta 1 + \theta 2$)/2 + 180) obtained by shifting a phase angle of an average 180 degrees, and wherein the first period comprises the fifth period and sixth period (Y1, Y2), and the second period comprises the third period and fourth period (X1, X2).

3. The power converter according to claim 1, wherein the inverter circuit is a two-level inverter.

4. The power converter according to claim 1, wherein
the switching-signal generating unit includes a carrier-wave generating unit that generates a carrier wave signal, a modulated-wave generating unit that generates a modulated wave signal, and a comparing unit that compares the carrier wave signal and the modulated wave signal and outputs the gate signal, and wherein,
in the three-dash pulse mode, the carrier wave signal and the modulated wave signal have the same zero-cross phase and a frequency of the carrier wave signal and a frequency of the modulated wave signal synchronize with each other.

5. The power converter according to claim 1, wherein
the switching-signal generating unit includes a carrier-wave generating unit that generates a carrier wave signal, a modulated-wave generating unit that generates a modulated wave signal, and a comparing unit that compares the carrier wave signal and the modulated wave signal and outputs the gate signal, and wherein, in the overmodulation mode, the carrier wave signal and the modulated wave signal have the same zero-cross phase and a frequency of the carrier wave signal and a frequency of the modulated wave signal synchronize with each other.

6. The power converter according to claim 1, wherein when the modulation rate of the inverter circuit is equal to or smaller than a second threshold smaller than the first threshold, the switching-signal generating unit outputs the gate signal in an asynchronous PWM mode in which the inverter circuit performs switching a plurality of times at a frequency not synchronizing with the frequency of the alternating-current voltage, and when the modulation rate of the inverter circuit is larger than the second threshold and equal to or smaller than the first threshold, the switching-signal generating unit outputs the gate signal in the overmodulation mode.

7. The power converter according to claim 6, wherein, when a modulation rate PMF during a one-pulse mode energized 180 deg is defined as 1 concerning the modulation rate of the inverter circuit, the second threshold is a value equal to or smaller than $\pi/\{2\times\sqrt{(3)}\}$.

8. The power converter according to claim 1, wherein, in the overmodulation mode, the first period decreases as the modulation rate increases and the second period increases as the modulation rate increases.

9. The power converter according to claim 1, wherein a number of pulses included in the gate signal in the first period is fixed.

10. The power converter according to claim 1, wherein, when the modulation rate of the inverter circuit is equal to or smaller than the first threshold, the modulation rate of the inverter circuit and the frequency of the alternating-current voltage are in a proportional relation.

11. A power converter comprising:
an inverter circuit that converts a direct-current voltage into an alternating-current voltage and outputs the alternating-current voltage; and
a switching-signal generating unit that outputs a gate signal for driving the inverter circuit to the inverter circuit, wherein
when a modulation rate of the inverter circuit is equal to or smaller than a first threshold, the switching-signal generating unit outputs the gate signal in an overmodulation mode including a first period and a second period in a half cycle of the alternating-current voltage, the first period being a period in which the inverter circuit performs switching a plurality of times, the second period being a period in which the switching of the inverter circuit is stopped for a period longer than an interval of the switchings of the inverter circuit in the first period, and
when the modulation rate of the inverter circuit is larger than the first threshold, the switching-signal generating unit outputs the gate signal in a one-dash pulse mode in which the inverter circuit outputs one pulse in the half cycle of the alternating-current voltage, the one pulse having a variable pulse width and a frequency synchronizing with a frequency of the alternating-current voltage.

12. The power converter according to claim 11, wherein the switching-signal generating unit fixes, when the gate signal is generated in the one-dash pulse mode or the overmodulation mode, in one cycle of an alternating-current voltage output command, the gate signal to always output a direct-current input positive side terminal voltage value of the inverter circuit in a third period (X1) centering on a first phase angle (θ1) for higher potential, fixes the gate signal to always output a direct-current input negative side terminal voltage value of the inverter circuit in a fourth period (X2) centering on a second phase angle (θ2: θ2>θ1) for lower potential, generates the gate signal in which a first ratio by a fifth period (Y1), which is obtained by excluding the third period and fourth period (X1 and X2) from a period between the first phase angle (θ1) and the second phase angle (θ2), and the third period (X1) and a second ratio by a sixth period (Y2), which is obtained by excluding the third period and fourth period (X1 and X2) from a period between the second phase angle (θ2) and a phase angle (θ1+360) obtained by shifting the first phase angle (θ1) 360 degrees in a positive direction, and the fourth period (X2) are set on the basis of a modulation rate command or an alternating-current voltage output amplitude command value, and maintains, as a phase angle command condition for turning ON and OFF gate signals in the fifth period and sixth period (Y1 and Y2), in the fifth period (Y1), a ratio of period widths between each of the phase angles for turning on and off the gate signal and an average ((θ1+θ2)/2) of the first and second phase angles (θ1 and θ2), and maintains, in the sixth period (Y2), a ratio of period widths between each of the phase angles for turning on and off the gate signal and a phase angle ((θ1+θ2)/2+180) obtained by shifting a phase angle of an average 180 degrees, and wherein the first period comprises the fifth period and sixth period (Y1, Y2), and the second period comprises the third period and fourth period (X1, X2).

13. The power converter according to claim 11, wherein the inverter circuit is a three-level inverter.

14. The power converter according to claim 11, wherein the switching-signal generating unit includes a carrier-wave generating unit that generates a carrier wave signal, a modulated-wave generating unit that generates a modulated wave signal, and a comparing unit that compares the carrier wave signal and the modulated wave signal and outputs the gate signal, and, wherein, in the one-dash pulse mode, the carrier wave signal and the modulated wave signal have the same zero-cross phase and a frequency of the carrier wave signal and a frequency of the modulated wave signal synchronize with each other.

15. The power converter according to claim 11, wherein the switching-signal generating unit includes:
a carrier-wave generating unit that generates a carrier wave signal;
a modulated-wave generating unit that generates a modulated wave signal; and
a comparing unit that compares the carrier wave signal and the modulated wave signal and outputs the gate signal,
wherein, in the overmodulation mode, the carrier wave signal and the modulated wave signal have the same zero-cross phase, and a frequency of the carrier wave signal and a frequency of the modulated wave signal synchronize with each other.

16. A power converter comprising:
an inverter circuit that converts a direct-current voltage into an alternating-current voltage and outputs the alternating-current voltage; and
a switching-signal generating unit that outputs a gate signal for driving the inverter circuit to the inverter circuit, wherein
when a modulation rate of the inverter circuit is equal to or smaller than a first threshold smaller than 1, and is larger than a second threshold smaller than the first threshold, the switching generating unit outputs the gate signal in an overmodulation mode including a first period and a second period in a half cycle of the alternating-current voltage, the first period being a period in which the inverter circuit performs switching a plurality of times, the second period being a period in which the switching of the inverter circuit is stopped for a period longer than an interval between the switchings of the inverter circuit in the first period,
when the modulation rate of the inverter circuit is equal to or smaller than the second threshold, the switching-signal generating unit outputs the gate signal in an asynchronous PWM mode in which the inverter circuit performs switching a plurality of times at a frequency not synchronizing with a frequency of the alternating-current voltage, and a frequency of the switching of the inverter circuit in the overmodulation mode synchronizes with the frequency of the alternating-current voltage.

17. The power converter according to claim 16, wherein when the modulation rate of the inverter circuit is larger than the second threshold and equal to or smaller than a third threshold smaller than the first threshold, the switching-signal generating unit outputs the gate signal in an overmodulation preparation mode in which the inverter circuit performs switching a plurality of times at a frequency synchronizing with the frequency of the alternating-current voltage and wherein when the modulation rate of the inverter circuit is larger than the third threshold and equal to or smaller than the first threshold, the switching-signal generating unit outputs the gate signal in the overmodulation mode.

18. The power converter according to claim 17, wherein the switching-signal generating unit includes:

a carrier-wave generating unit that generates a carrier wave signal;

a modulated-wave generating unit that generates a modulated wave signal; and a comparing unit that compares the carrier wave signal and the modulated wave signal and outputs the gate signal, wherein, in an overmodulation preparation mode, the carrier wave signal and the modulated wave signal have the same zero-cross phase, and a frequency of the carrier wave signal and a frequency of the modulated wave signal synchronize with each other.

19. The power converter according to claim 16, wherein the switching-signal generating unit includes:

a carrier-wave generating unit that generates a carrier wave signal;

a modulated-wave generating unit that generates a modulated wave signal; and a comparing unit that compares the carrier wave signal and the modulated wave signal and outputs the gate signal, wherein, in the overmodulation mode, the carrier wave signal and the modulated wave signal have the same zero-cross phase, and a frequency of the carrier wave signal and a frequency of the modulated wave signal synchronize with each other.

20. The power converter according to claim 16, wherein when the modulation rate of the inverter circuit is 1, the switching-signal generating unit outputs the gate signal in a one-pulse mode energized 180 deg, and wherein a frequency of the switching of the inverter circuit in the one-pulse mode synchronizes with the frequency of the alternating-current voltage.

* * * * *